US00RE49833E

(19) United States
(12) Reissued Patent
Ophardt et al.

(10) Patent Number: US RE49,833 E
(45) Date of Reissued Patent: Feb. 13, 2024

(54) MULTIPLE AIR CHAMBER FOAM PUMP

(71) Applicant: OP-Hygiene IP GmbH, Niederbipp (CH)

(72) Inventors: Heiner Ophardt, Arisdorf (CH); Andrew Jones, St. Anns (CA)

(73) Assignee: OP-Hygiene IP GmbH, Niederbipp (CH)

(21) Appl. No.: 17/180,144

(22) Filed: Feb. 19, 2021

Related U.S. Patent Documents

Reissue of:
(64) Patent No.: 9,573,152
Issued: Feb. 21, 2017
Appl. No.: 14/607,503
Filed: Jan. 28, 2015

(30) Foreign Application Priority Data

Jan. 29, 2014 (CA) ..... CA 2841279

(51) Int. Cl.
*B05B 11/10* (2023.01)
*A47K 5/14* (2006.01)
*B05B 7/00* (2006.01)

(52) U.S. Cl.
CPC ..... *B05B 11/1087* (2023.01); *A47K 5/14* (2013.01); *B05B 11/1001* (2023.01); *B05B 7/0037* (2013.01); *B05B 11/1069* (2023.01); *B05B 11/1074* (2023.01)

(58) Field of Classification Search
CPC ..... B05B 11/3087; B05B 11/3001; B05B 7/0037; B05B 11/3069; B05B 11/3074; B05B 7/005; B05B 7/0062; B05B 7/0056; B05B 7/2402; B05B 7/2408; B05B 11/00; A47K 5/14
USPC ..... 222/145.5–145.6, 190, 132–137, 129, 222/180, 181.2, 325, 321.7–321.9
See application file for complete search history.

(56) References Cited

U.S. PATENT DOCUMENTS

| | | | | |
|---|---|---|---|---|
| 5,129,550 | A | 7/1992 | Eschbach | |
| 5,165,577 | A | 11/1992 | Ophardt | |
| 5,676,277 | A | 10/1997 | Ophardt | |
| 6,601,736 | B2 | 8/2003 | Ophardt et al. | |
| 7,267,251 | B2 | 9/2007 | Ophardt | |
| 7,303,099 | B2 | 12/2007 | Ophardt | |
| 7,337,930 | B2 | 3/2008 | Ophardt et al. | |
| 7,455,195 | B2 * | 11/2008 | Mekata | B05B 11/0043 222/105 |
| 7,823,751 | B2 | 11/2010 | Ophardt et al. | |
| 7,861,898 | B2 | 1/2011 | Ophardt | |
| 7,959,037 | B2 | 6/2011 | Ophardt et al. | |
| 8,157,134 | B2 | 4/2012 | Ophardt et al. | |
| 8,272,539 | B2 | 9/2012 | Ophardt et al. | |
| 8,360,286 | B2 | 1/2013 | Shi et al. | |
| 8,365,965 | B2 | 2/2013 | Ophardt | |
| 8,413,855 | B2 | 4/2013 | Ophardt et al. | |

(Continued)

*Primary Examiner* — Terrence R Till
(74) *Attorney, Agent, or Firm* — Thorpe North & Western, LLP; Peter M. de Jonge; Garron M. Hobson

(57) ABSTRACT

An improved foam piston pump in which a multiple of air pumps are disposed coaxially about a piston member and spaced axially along the piston member, preferably coaxially with a liquid pump for discharging air and liquid as foam. Each air pump is preferably provided by a modular piston within a modular casing assembly such that arrangements with one, two or more identical air pumps can be assembled from a plurality of the same modular components.

11 Claims, 17 Drawing Sheets

(56) References Cited

U.S. PATENT DOCUMENTS

| | | | | |
|---|---|---|---|---|
| 8,474,664 | B2 | 7/2013 | Ophardt et al. | |
| 8,701,943 | B2 | 4/2014 | Ophardt et al. | |
| 8,733,588 | B2 | 5/2014 | Ophardt et al. | |
| 8,919,611 | B2 | 12/2014 | Ophardt et al. | |
| 2007/0278247 | A1* | 12/2007 | Banks | B05B 7/2497 222/132 |
| 2011/0240680 | A1 | 10/2011 | Ophardt et al. | |
| 2012/0000931 | A1* | 1/2012 | Cabiri | A61M 15/0045 222/1 |
| 2013/0336823 | A1 | 12/2013 | Ophardt et al. | |
| 2014/0061245 | A1* | 3/2014 | McNulty | B05B 11/3087 222/190 |
| 2014/0099224 | A1 | 4/2014 | Ophardt et al. | |
| 2015/0034680 | A1* | 2/2015 | Babikian | B05B 11/0097 222/321.9 |

* cited by examiner

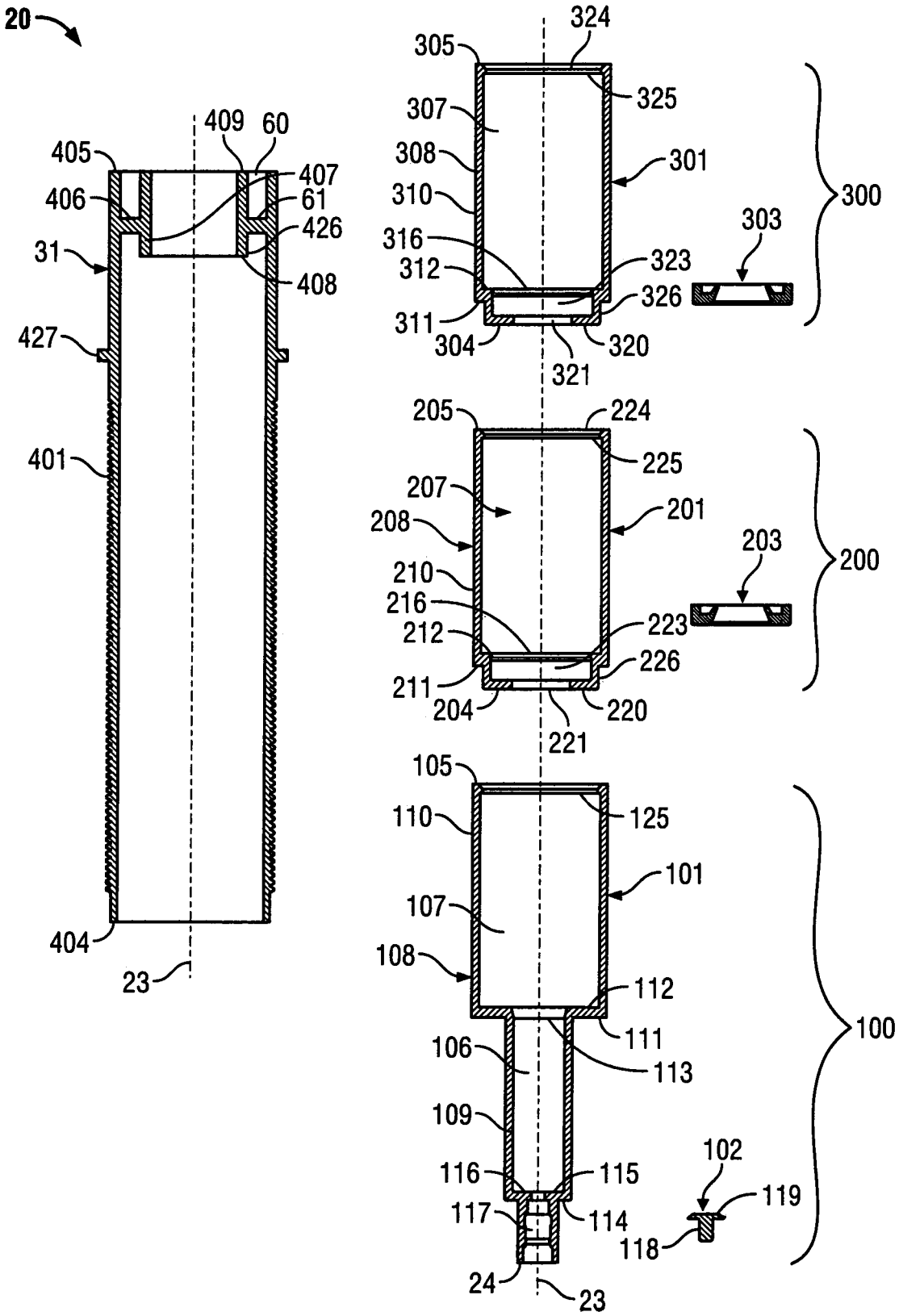
FIG. 5 AMENDED

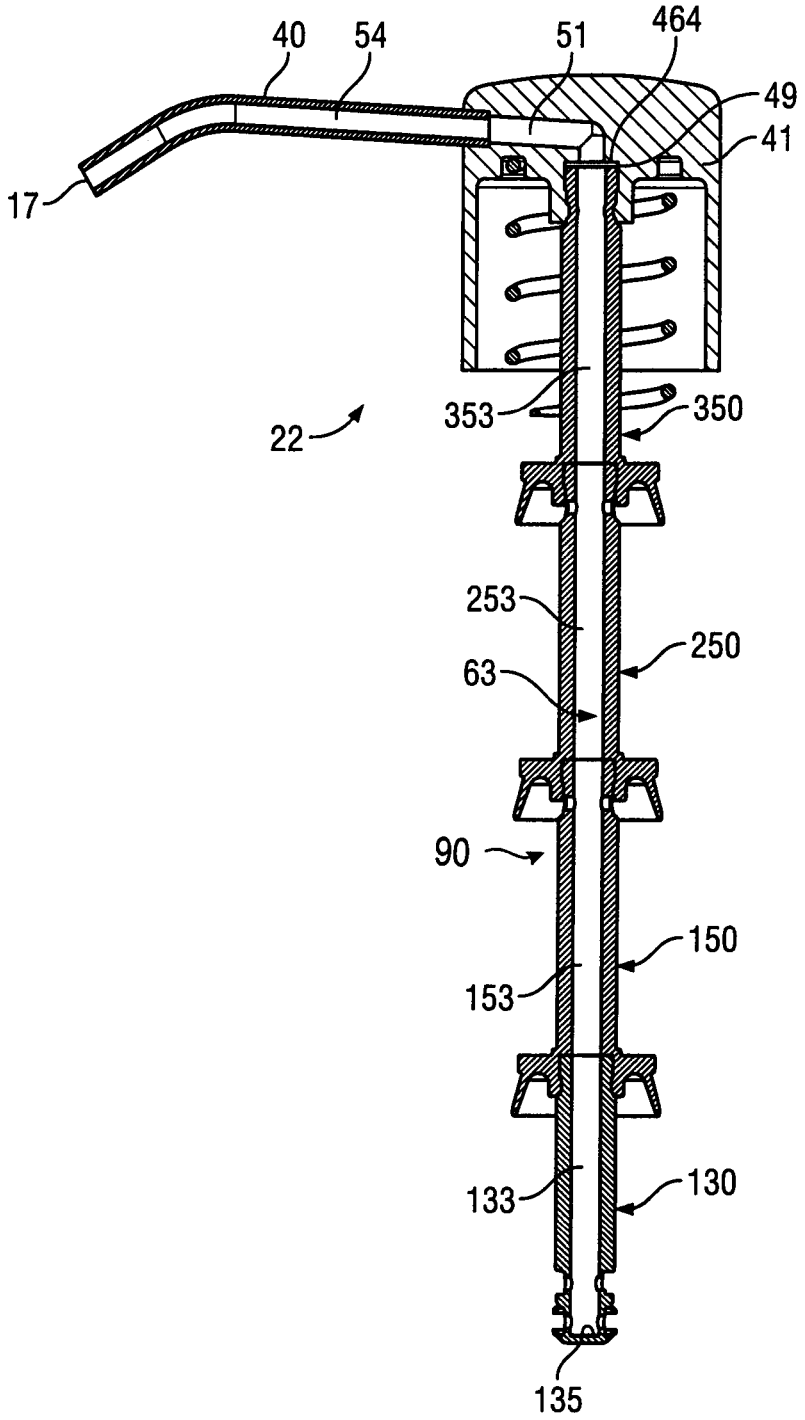
FIG. 7 AMENDED

MULTIPLE AIR CHAMBER FOAM PUMP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

SCOPE OF THE INVENTION

This invention relates to foam pumps for dispensing liquid mixed with air as a foam and, more particularly, to a piston pump with multiple axially spaced air pumps.

BACKGROUND OF THE INVENTION

Liquid piston pumps for dispensing liquid through a countertop from a reservoir disposed below the countertop are known in which the body of the pump is inserted through an opening in the countertop into a reservoir, with merely an actuator and discharge outlet above the countertop. These liquid pumps are operative in a single stroke as to allow the production of a desired unit dosage volume of liquid. The opening through the countertop is selected to be as small as possible, for example, ⅞ inch in diameter, to provide a pleasing appearance.

Foam piston pumps are known for simultaneously dispensing a liquid mixed with air as in a foam. One such foaming pump is disclosed, for example, in U.S. Pat. No. 7,337,930 to Ophardt et al, issued Mar. 4, 2008, the disclosure of which is incorporated herein by reference.

The inventor of the present application has appreciated that previously known foam piston pumps suffer the disadvantage that the pumps typically cannot be inserted through a relatively small opening into a reservoir and have a reasonable stroke length while allowing an adequate volume of air to be displaced as to allow the production of a desired unit dosage volume of foamed liquid product in a single stroke. The present inventor has also appreciated the disadvantage that with known foam piston pumps, as the diameter of the opening through which the pump is to be inserted reduces, then the stroke length required to dispense a desired volume of air increases.

SUMMARY OF THE INVENTION

To at least partially overcome these disadvantages of previously known devices, the present invention provides an improved foam piston pump in which a multiple of air pumps are disposed coaxially about a piston member and spaced axially along the piston member.

In one aspect, the present invention provides a piston pump comprising:

a piston chamber-forming member extending longitudinally about an axis from a lower end to an upper end;

the piston chamber-forming member defining a central chamber therein coaxially about the axis within an annular chamber wall;

the piston chamber-forming member having a liquid inlet at the lower end in communication with a liquid in a reservoir;

a piston-forming element coaxially slidably received within the chamber in the piston chamber-forming member;

the piston-forming element comprising an elongate tubular stem with a central passageway longitudinally therethrough, the passageway extending from a lower end to an upper end;

the piston-forming element coaxially slidable within the piston chamber-forming member between an extended position and a retracted position in a cycle of operation comprising a withdrawal stroke and a retraction stroke to draw the liquid from the reservoir via the liquid inlet and discharge the liquid mixed with air through the upper end of the passageway;

a liquid pump formed between the piston chamber-forming member and the piston-forming element proximate the lower end of the piston chamber-forming member, the liquid pump operative in the cycle of operation to draw the liquid from the reservoir via the liquid inlet and discharge the liquid into the passageway proximate the lower end of the passageway;

a lower air pump formed between the piston chamber-forming member and the piston-forming element above the liquid pump operative in the cycle of operation in a withdrawal stroke to draw air from the atmosphere and in a retraction stroke to discharge air into the passageway through a lower air port which extends radially inwardly through the stem into the passageway;

a first upper air pump formed between the piston chamber-forming member and the piston-forming element axially above the lower air pump, the first upper air pump operative in the cycle of operation in the withdrawal stroke to draw air from the atmosphere and in the retraction stroke to discharge air into the passageway through a first upper air port which extends radially inwardly through the stem into the passageway at an axial location on the stem spaced axially above the lower air port;

a first upper air sealing annular flange on the piston chamber-forming member above the lower air pump, the first upper air sealing annular flange extending from the chamber wall radially inwardly to an annular distal edge in engagement with a radially outwardly directed first upper cylindrical wall on the stem axially above the first upper air port;

the annular distal edge of the first upper air sealing annular flange engaging the first upper cylindrical wall of the stem to prevent fluid flow axially inwardly therepast, a first upper air sealing disc on the stem axially above the first upper air sealing annular flange on the piston chamber-forming member;

the first upper air sealing disc extending radially outwardly from the stem to an annular distal edge in engagement with a first cylindrical upper portion of the chamber wall on the piston chamber-forming member axially above the first upper air sealing annular flange;

the annular distal edge of the first upper air sealing disc engaging the first cylindrical upper portion of the chamber wall on the piston chamber-forming member to prevent fluid flow axially upwardly therepast;

the first upper air pump having a first upper air compartment open to the first upper air port and defined (a) annularly between the stem of the piston-forming element and the first cylindrical upper portion of the chamber wall of the piston chamber-forming member, and (b) axially between the first upper air sealing annular flange and the first upper air sealing disc;

in a cycle of operation in the withdrawal stroke, an axial distance between the first upper air sealing annular flange and the first upper air sealing disc increases thereby increasing a volume of the first upper air compartment and drawing air into the first upper air compartment and, in the retraction stroke, the axial distance between the first upper air sealing annular flange and the first upper air sealing disc decreases thereby decreasing the volume of the first upper air compartment and discharging air from the first upper air compartment through the first upper air port into the passageway.

In another aspect, the present invention provides a piston pump comprising:

a piston chamber-forming member extending longitudinally about an axis from an inner end to an outer end;

the piston chamber-forming member defining a central chamber therein coaxially about the axis within an annular chamber wall;

the piston chamber-forming member having a liquid inlet at the inner end in communication with a liquid in a reservoir;

a piston-forming element coaxially slidably received within the chamber in the piston chamber-forming member;

the piston-forming element comprising an elongate tubular stem with a central passageway longitudinally therethrough, the passageway extending from an inner end to an outer end;

the piston-forming element coaxially slidable within the piston chamber-forming member between an extended position and a retracted position in a cycle of operation comprising a withdrawal stroke and a retraction stroke to draw the liquid from the reservoir via the liquid inlet and discharge the liquid mixed with air through the outer end of the passageway;

a liquid pump formed between the piston chamber-forming member and the piston-forming element proximate the inner end of the piston chamber-forming member, the liquid pump operative in the cycle of operation to draw the liquid from the reservoir via the liquid inlet and discharge the liquid into the passageway proximate the inner end of the passageway;

an inner air pump formed between the piston chamber-forming member and the piston-forming element axially outwardly of the liquid pump operative in the cycle of operation in a withdrawal stroke to draw air from the atmosphere and in a retraction stroke to discharge air into the passageway through an inner air port which extends radially inwardly through the stem into the passageway;

a first outer air pump formed between the piston chamber-forming member and the piston-forming element axially outwardly of the inner air pump, the first outer air pump operative in the cycle of operation in the withdrawal stroke to draw air from the atmosphere and in the retraction stroke to discharge air into the passageway through a first outer air port which extends radially inwardly through the stem into the passageway at an axial location on the stem spaced axially outwardly of the inner air port;

a first outer air sealing annular flange on the piston chamber-forming member axially outwardly of the inner air pump, the first outer air sealing annular flange extending from the chamber wall radially inwardly to an annular distal edge in engagement with a radially outwardly directed first outer cylindrical wall on the stem axially inwardly of the first outer air port;

the annular distal edge of the first outer air sealing annular flange engaging the first outer cylindrical wall of the stem to prevent fluid flow axially inwardly therepast, a first outer air sealing disc on the stem axially outwardly of the first outer air port and axially outwardly of the first outer air sealing annular flange on the piston chamber-forming member;

the first outer air sealing disc extending radially outwardly from the stem to an annular distal edge in engagement with a first cylindrical outer portion of the chamber wall on the piston chamber-forming member axially outwardly of the first outer air sealing annular flange;

the annular distal edge of the first outer air sealing disc engaging the first cylindrical outer portion of the chamber wall on the piston chamber-forming member to prevent fluid flow axially upwardly therepast;

the first outer air pump having a first outer air compartment open to the first outer air port and defined (a) annularly between the stem of the piston-forming element and the first cylindrical outer portion of the chamber wall of the piston chamber-forming member, and (b) axially between the first outer air sealing annular flange and the first outer air sealing disc;

in a cycle of operation in the withdrawal stroke, an axial distance between the first outer air sealing annular flange and the first outer air sealing disc increases thereby increasing a volume of the first outer air compartment and drawing air into the first outer air compartment and, in the retraction stroke, the axial distance between the first outer air sealing annular flange and the first outer air sealing disc decreases thereby decreasing the volume of the first outer air compartment and discharging air from the first outer air compartment through the first outer air port into the passageway.

BRIEF DESCRIPTION OF THE DRAWINGS

Further aspects and advantages of the present invention will become apparent from the following description taken together with the accompanying drawings in which:

FIG. 5 is an exploded cross-sectional side view of the piston chamber-forming member of FIG. 4;

FIG. 7 is a cross-sectional side view of a piston-forming element and a spring of the pump of FIG. 2;

DETAILED DESCRIPTION OF THE DRAWINGS

Figure 1:
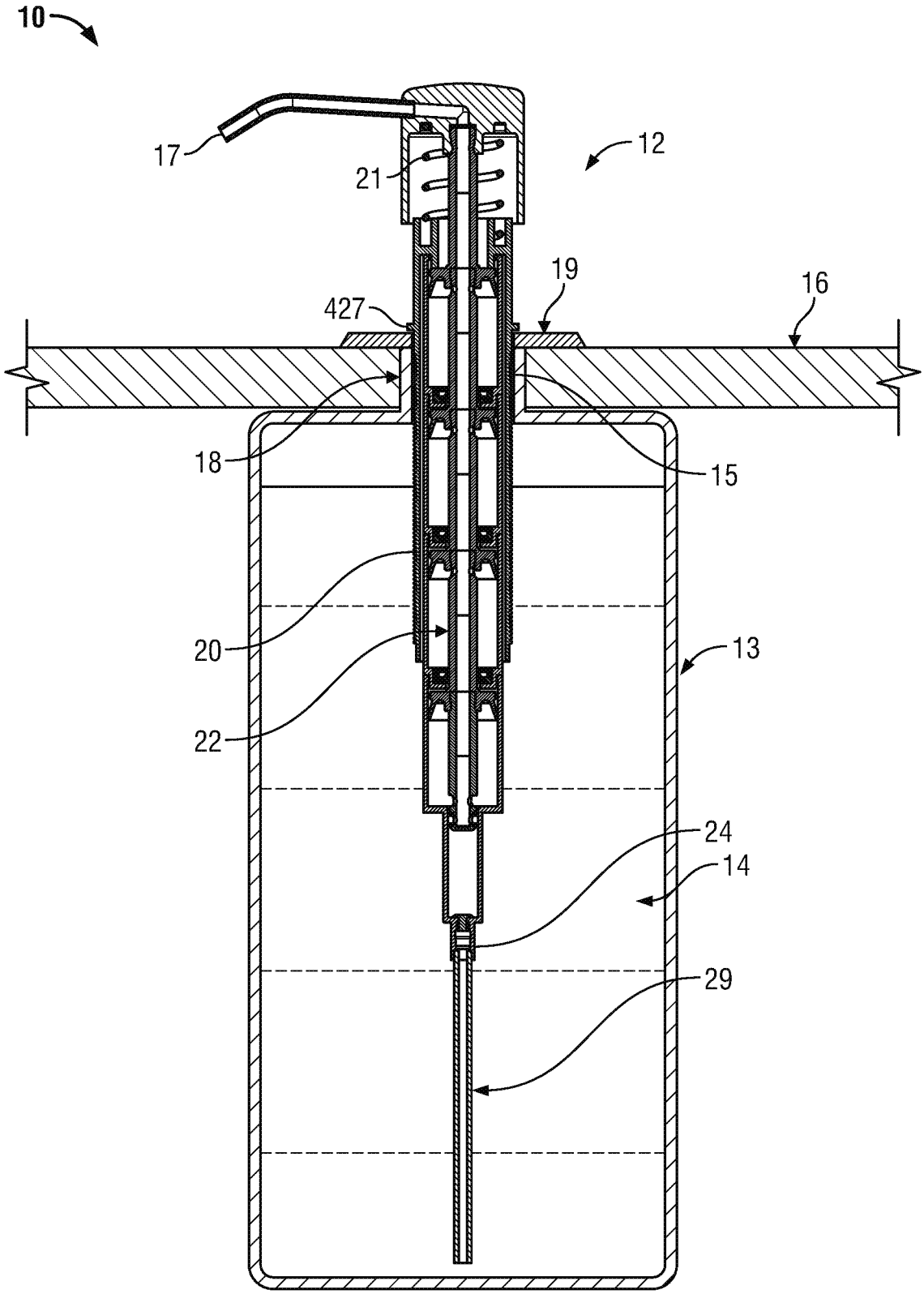
FIG. 1 is cross-sectional front view of a dispenser with a foam pump in accordance with the first embodiment of the present invention in an extended position.

Reference is made to FIG. 1 which illustrates a dispenser 10 incorporating a pump 12 in accordance with the first embodiment of the present invention. The dispenser 10 includes a reservoir 13 containing a fluid 14. The reservoir 13 has a cylindrical upwardly opening neck 15 and the pump 12 extends downwardly through the neck 15 into the reservoir 13 and is operative to dispense fluid 14 from the reservoir out a discharge outlet 17 on the pump 12. As shown in FIG. 1, the reservoir 13 is fixedly secured to a countertop 16 with the neck 15 extending upwardly through an opening 18 through the countertop 16 and being engaged by a threaded collar 19 to secure the reservoir 13 to the countertop 16 underneath the countertop 16. The pump 12 is vertically slidable within the neck 15 for removal and replacement. With the pump 12 removed, the reservoir 13 may be replenished with the fluid 14 by a user pouring fluid downwardly into the reservoir 13 through the neck 15. This arrangement is useful, for example, in a kitchen or washroom, to provide for dispensing of foamed cleaning fluid by use of the pump 12 above the top of countertop 16 from the reservoir 13 permanently secured below the countertop 16, yet with substantial portions of the pump 12 disposed below the countertop 16.

The pump 12 comprises a piston chamber-forming member 20, a spring 21 and a piston-forming element 22.

Figure 4:
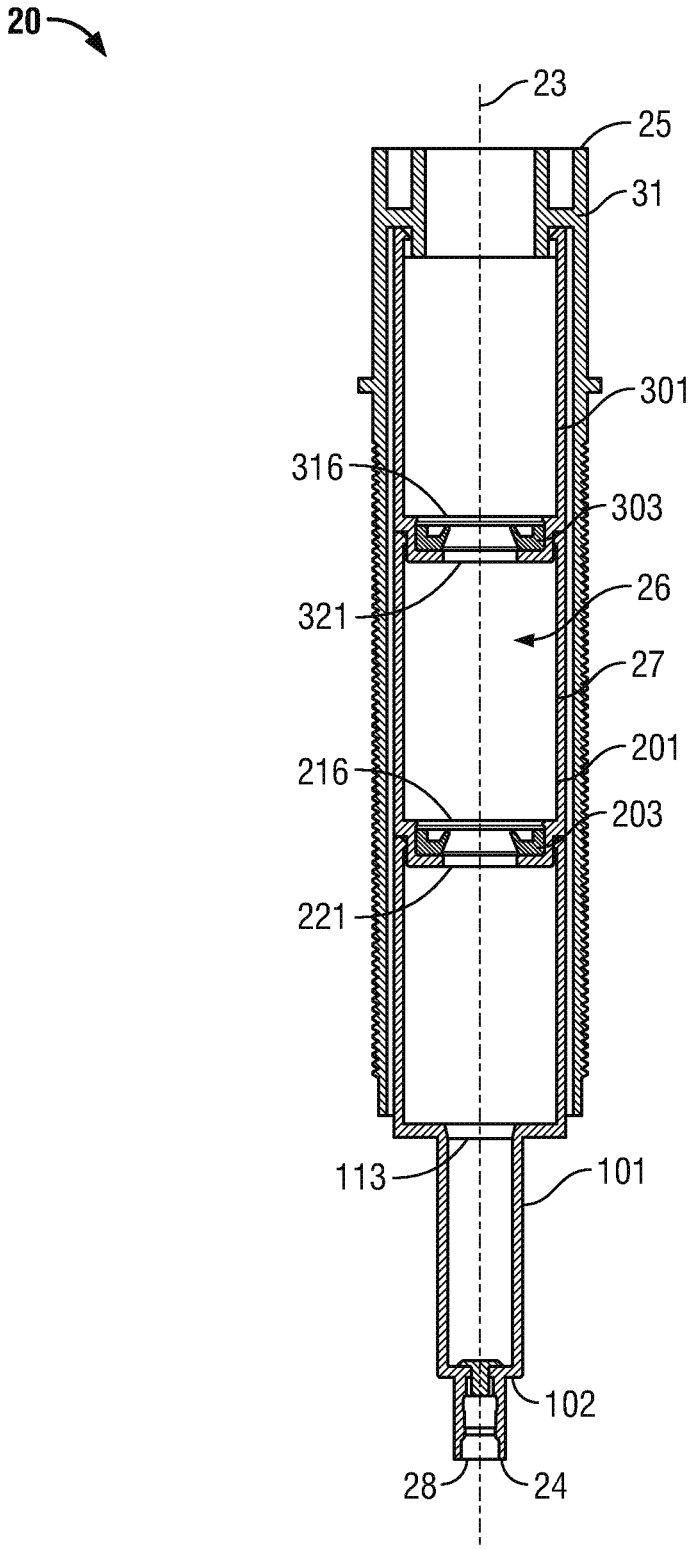
FIG. 4 is a cross-sectional side view of a piston chamber-forming member of the pump in FIG. 2.

As seen in FIG. 4, the piston chamber-forming member 20 extends longitudinally about a central axis 23 from a lower end 24 to an upper end 25. The piston chamber-forming member 20 defines a central chamber 26 therein coaxially about the axis 23 and within an annular chamber wall 27. The piston chamber-forming member 20 has a liquid inlet 28 at the lower end 24 in communication with the liquid 14 in the reservoir 13. As seen only in FIG. 1, a hollow dip tube 29 is coupled to the lower end 24 of the piston chamber-forming member 20 by which the liquid inlet 28 is in communication with fluid 14 in the reservoir 13.

Figure 6:
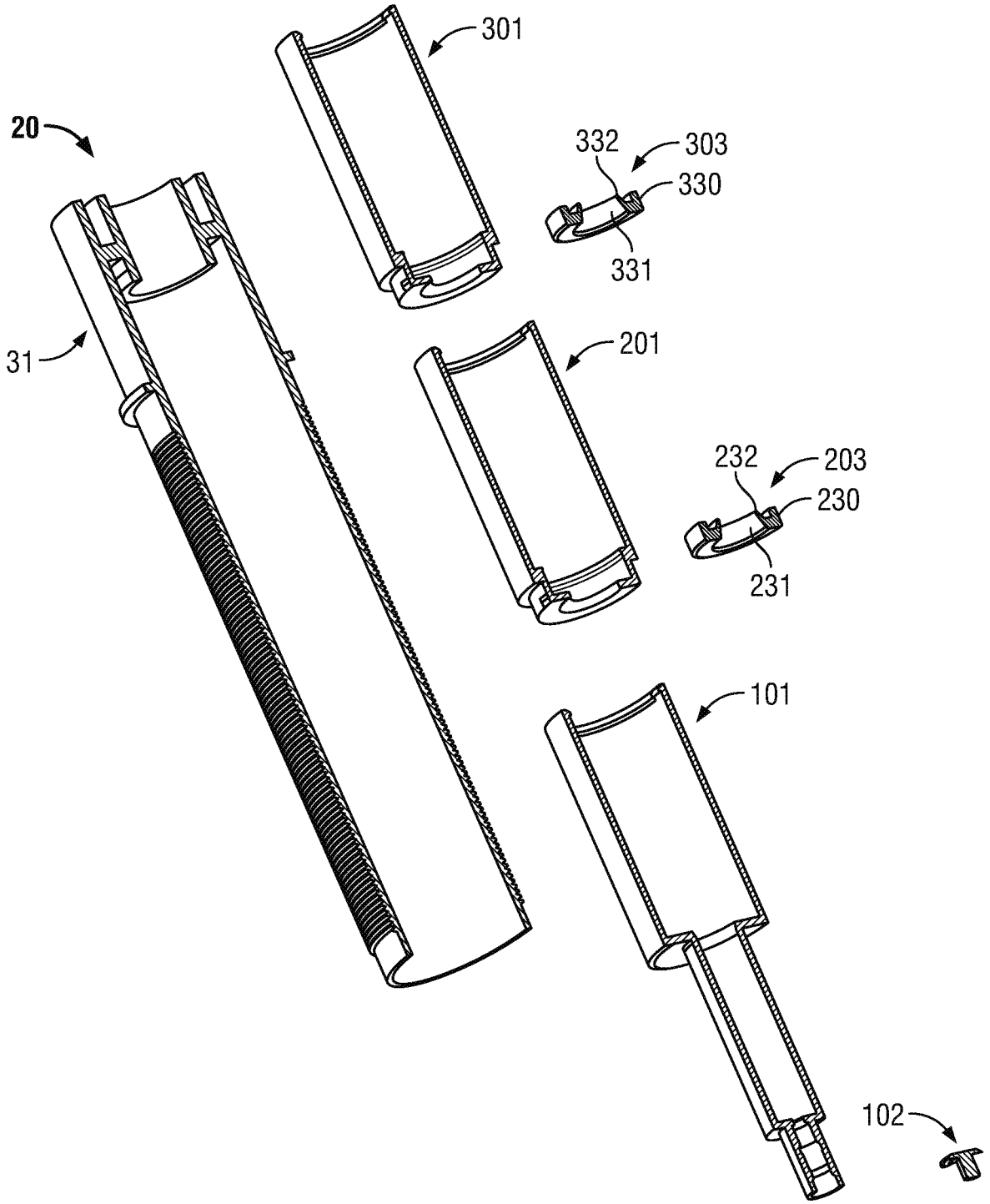
FIG. 6 is an exploded pictorial cross-sectional view of the piston chamber-forming member of FIG. 4.

Reference is made to FIGS. 5 and 6 which show in exploded views components of the piston chamber-forming member 20. These components comprise:

- a housing 31;
- a lower casing assembly 100 including a lower casing 101 and a one-way valve 102;
- a first upper casing assembly 200 comprising a first upper casing 201 and a first upper annular seal disc 203; and
- a second upper casing assembly 300 comprising a second upper casing 301 and a second upper annular seal disc 303.

In the preferred embodiment, the first upper casing assembly 200 is identical to the second upper casing assembly 300 and each may be considered to be an identical modular component, which is advantageous but not necessary as each may be different.

The lower casing 101 extends from the lower end 24 to an upper end 105 and defines therein a liquid chamber 106 and coaxially above the liquid chamber 106 a lower air chamber 107. The lower casing 101 has a wall 108 with a cylindrical first lower portion 109 and a cylindrical second lower portion 110. The liquid chamber 106 is defined within the cylindrical first lower portion 109 of the wall 108. The lower air chamber 107 is defined within the cylindrical second lower portion 110 of the wall 108. The liquid chamber 106 has a diameter which is less than the diameter of the lower air chamber 107. The wall 108 includes a radially inwardly extending shoulder 111 which forms a lower end 112 of the lower air chamber 107. The liquid chamber 106 opens at an upper end 113 through the shoulder 111 coaxially into the lower air chamber 107. The wall 108 extends inwardly as a shoulder 114 at a lower end 115 of the liquid chamber 106. An opening 116 through the shoulder 114 at the lower end 115 of the liquid chamber 106 opens via a passageway 117 to the lower end 24.

The one-way valve 102 is secured in a friction-fit relation within the opening 116 at the lower end 115 of the liquid chamber 106. The one-way valve 102 has a fluted stem 118 and a resilient annular disc 119 extending radially outwardly from the stem 118 at the upper end of the one-way valve 102. The stem 118 carries axially extended flutes permitting fluid flow axially past the stem 118 when the one-way valve 102 is snap-fitted within the opening 116. The disc 119 is resilient and biased such that under its inherent bias a circumferential edge of the disc 119 engages the shoulder 114 to prevent fluid flow downwardly from the liquid chamber 106 to the reservoir 13. The disc 119 is deflectable such that when the pressure in the liquid chamber 106 is less than the pressure in the reservoir 13 fluid will flow upwardly past the disc 119 from the reservoir 13 into the liquid chamber 106. The wall 108 of the lower casing 101 at its upper end 105 defines an inwardly directed annular catch shoulder 125 with an annular surface directed at least in part axially downwardly.

The first upper casing 201 has a lower end 204 and an upper end 205. The first upper casing 201 has a wall 208 with a cylindrical upper portion 210 defining a first upper air chamber 207 therein. The wall 208 includes a radially inwardly extending annular upper shoulder 211 which forms a lower end 212 of the first upper air chamber 207. An opening 216 extends through the upper shoulder 211. The wall 208 also includes a radially inwardly extending annular lower shoulder 220. An opening 221 extends through the lower shoulder 220. The wall 208 defines between the upper shoulder 211 and the lower shoulder 220 an annular recess 223. The opening 216 through the upper shoulder 111 has a diameter less than a diameter of the recess 223 and less than a diameter of the opening 221 through the lower shoulder 220 such that the seal disc 203 which is resilient may be forced downwardly into the recess 223 past the shoulder 214 to be received within the recess 223 against removal.

The first upper casing 201 has an opening 224 at its upper end 205. The wall 208 of the first upper casing 201 at its upper end 205 defines an inwardly directed annular catch shoulder 225 with an annular surface directed at least in part axially downwardly.

The wall 208 of the first upper casing 201 carries about its lower end 204 a radially outwardly extending catching shoulder 226 with an annular surface directed at least in part axially upwardly. The upper end 105 of the lower casing 101 is adapted to engage the lower end 204 of the first upper casing 201 in a snap-fit relation with the catch shoulder 125 of the lower casing 101 to engage the catching shoulder 226 of the first upper casing 201 to resist disengagement.

The second upper casing 301 has a wall 308 with a cylindrical upper portion 310 defining a second upper air chamber 307 therein. The wall 308 includes a radially inwardly extending annular upper shoulder 311 which forms a lower end 312 of the second upper air chamber 307. An opening 316 extends through the upper shoulder 311. The wall 308 also includes a radially inwardly extending annular lower shoulder 320. An opening 321 extends through the lower shoulder 320. The wall 308 defines between the upper shoulder 311 and the lower shoulder 320 an annular recess 323. The opening 316 through the upper shoulder 311 has a diameter less than the diameter of the recess 323 and less than a diameter of the opening 321 through the lower shoulder 320 such that the seal disc 303 which is resilient may be forced downwardly into the recess 323 past the shoulder 314 to be received within the recess 323 against removal. The wall 308 of the second upper casing 301 at its upper end 305 defines an inwardly directed annular catch shoulder 325 with an annular surface directed at least in part axially downwardly.

The wall 308 of the second upper casing 301 carries about the opening 324 at its lower end 304 a radially outwardly extending catching shoulder 326 with an annular surface directed at least in part axially upwardly. The upper end 205 of the upper air casing 201 is adapted to engage the lower end 304 of the second upper casing 301 in a snap-fit relation with the catch shoulder 225 of the first upper casing 201 to engage the catching shoulder 326 of the second upper casing 301 to resist disengagement.

The housing 31 comprises a generally cylindrical outer tube 401 extending coaxially about the axis 23. The outer tube 401 has a lower end 404 and an upper end 405. Proximate the upper end 405 of the outer tube 401, an annular flange 406 extends radially inwardly from the outer tube 401. The annular flange 406 the supports a cylindrical inner tube 407 which extends coaxial with the outer tube 401 about the axis 23. The inner tube 407 has a lower end 408 and an upper end 409. The lower end 408 of the inner tube 407 carries a radially outwardly extending catching shoulder 426 with an annular surface directed at least in part axially upwardly.

The upper end 305 of the second upper air casing 301 is adapted to engage the lower end 408 of the inner tube 407 in a snap-fit relation with the catch shoulder 325 of the second upper casing 301 to engage the catching shoulder 426 of the inner tube 407 of the housing to resist disengagement.

The first annular seal disc 203 comprises a radially outermost annular ring 230 from which an annular sealing flange 231 extends radially inwardly to an annular distal end 232. The annular sealing flange 231 extends from the ring 230 radially inwardly and axially upwardly to the distal end 232.

The second annular seal disc 303 comprises a radially outermost annular ring 330 from which an annular sealing flange 331 extends radially inwardly to an annular distal end 332. The annular sealing flange 331 extends from the ring 330 radially inwardly and axially upwardly to the distal end 332.

In an assembled piston chamber-forming member 20 as seen in FIG. 4, the lower casing 101 is secured in a friction-fit relation to the first upper casing 201 which is secured in a friction-fit relation to the second upper casing 301 which is secured in a friction-fit relation to the housing 31. The one-way valve 102 is secured in a friction-fit relation to the lower casing 101. The first annular seal disc 203 is snap-fitted into the recess 223 of the first upper casing 201. The second annular seal disc 303 is secured in a friction-fit relation into the recess 323 of the second upper casing 301. The annular chamber wall 27 includes the wall 108, the wall 208 and the wall 308. The central chamber 26 includes, axially inline one above the other, the liquid chamber 106, the lower air chamber 107, the first upper air chamber 207 and the second upper air chamber 307 in axial communication with each other via the openings 113, 221, 216, 321 and 316.

Reference is made to FIGS. 7 to 11 which illustrate the piston-forming element 22. As best seen in the exploded views of FIGS. 8 and 9, the piston-forming element 22 includes a liquid piston 130, a lower air piston 150, a first upper air piston 250, a second upper air piston 350, a foam producing member 464, a head 41 and an outlet tube 40. In the first embodiment shown, each of the lower air piston 150 and the first upper air piston 250 is identical and each may be considered to be an identical modular component, which is advantageous but not necessary as each may be different. The second upper air piston 350 is identical to the lower air piston 150 with the exception that there is no equivalent on the second upper air piston 350 to the air port 162. The second air piston 350 may be identical to the lower air piston 150 with the second air piston 350 having an air port, not shown, identical to the air port 162 provided that the head 41 engages the second air piston 350 in a manner to sealably close the air port on the second air piston 350.

Figure 8:
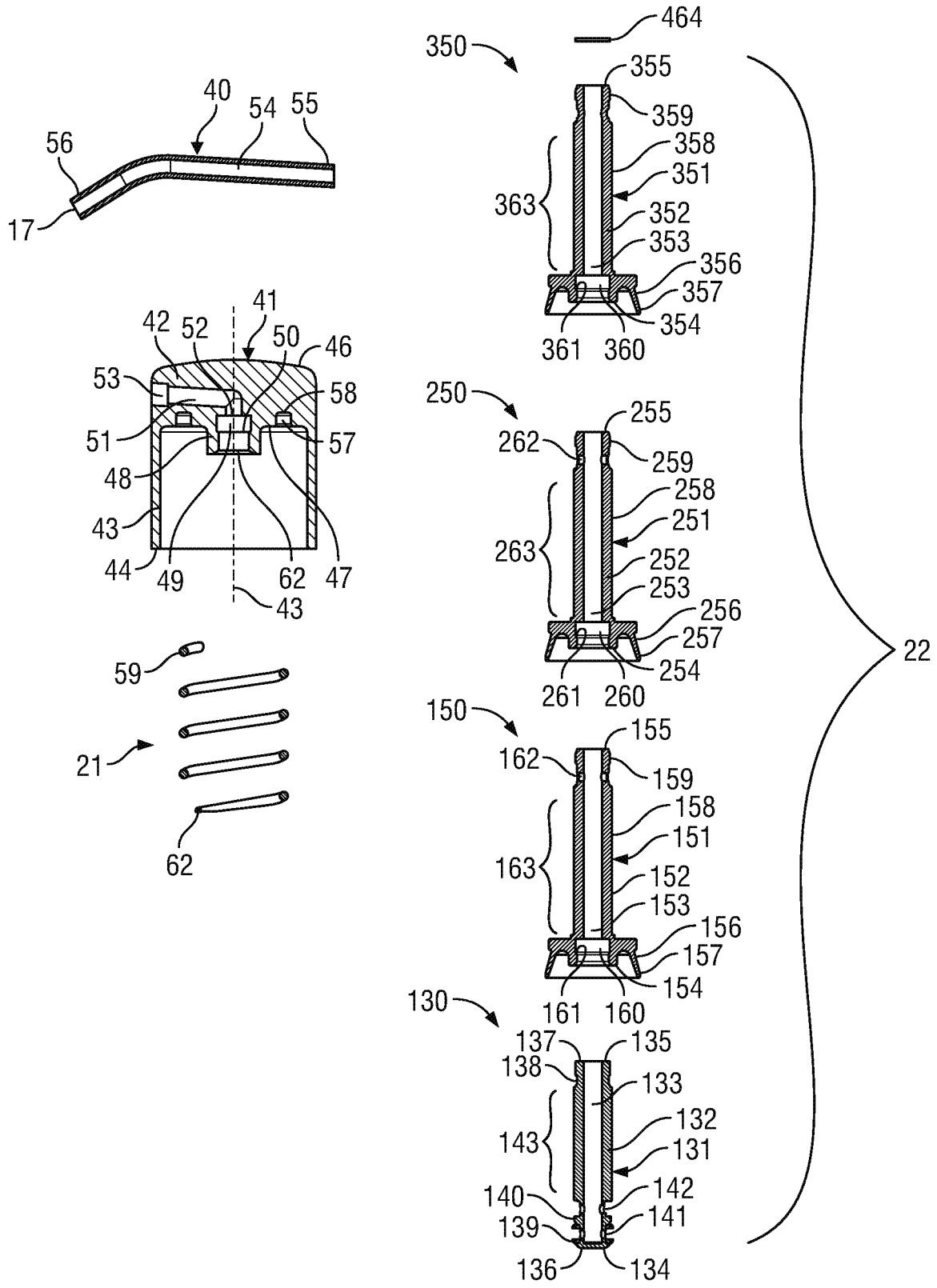
FIG. 8 is an exploded cross-sectional side view of the piston-forming element and the spring of FIG. 7.
Figure 9:
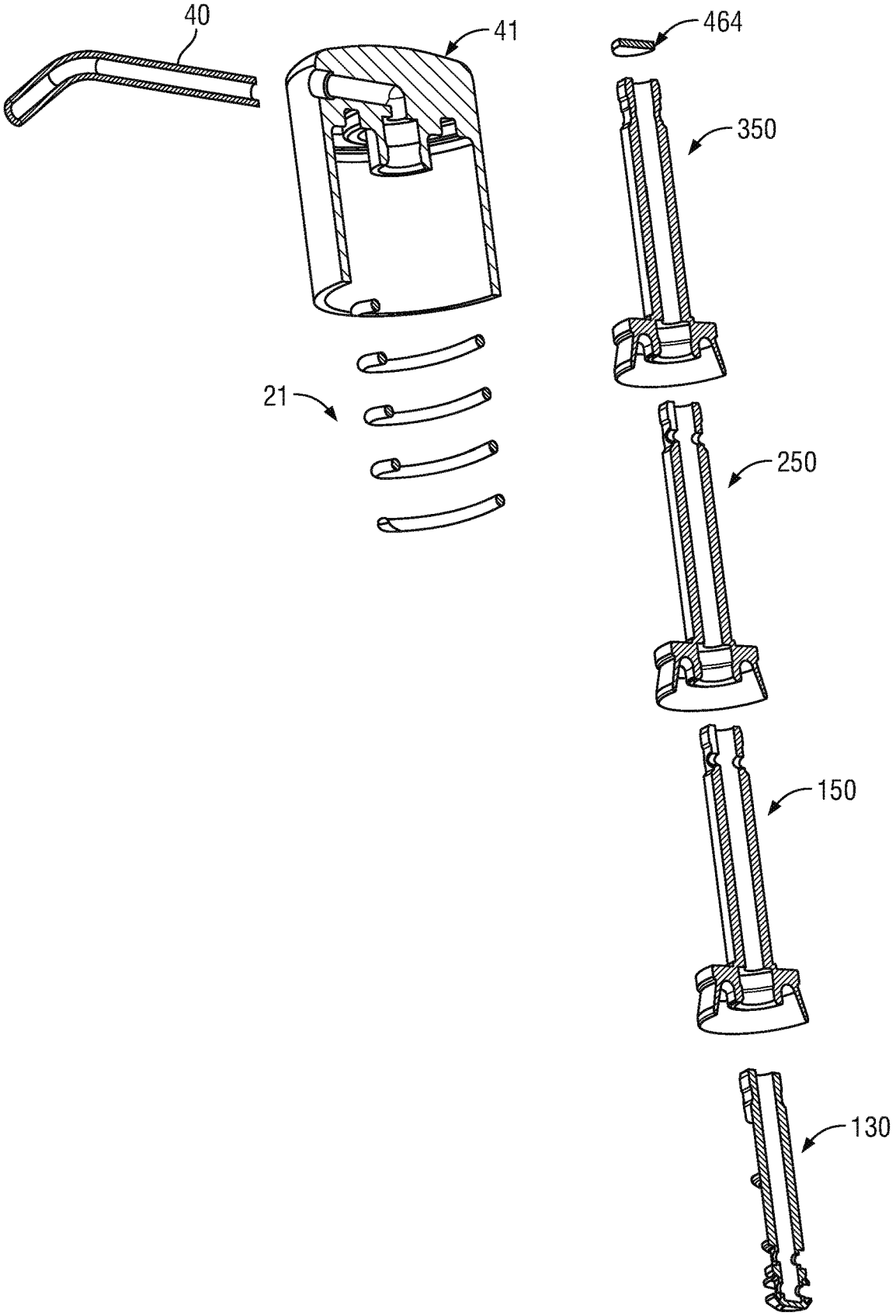
FIG. 9 is an exploded pictorial cross-sectional view of the piston-forming element and the spring of FIG. 7.

The lower air piston 150 has an elongate tubular stem 151 with a tubular wall 152. The stem 151 of the lower air piston 150 has a lower end 154 and an upper end 155. The tubular wall 152 defines a central passageway 153 longitudinally therethrough from the lower end 154 to the upper end 155 open at each end. The lower air piston 150 carries a first lower air sealing disc 156 which extends radially outwardly and axially downwardly from the stem 151 to an annular distal edge 157. Proximate the upper end 155, a radially outwardly directed surface 158 of the wall 152 of the stem 151 carries a radially outwardly extending catching shoulder 159 with an annular surface directed, at least in part, axially downwardly. Proximate the lower end 154, the stem 151 carries a socket 160 with a radially inwardly extending catch shoulder 161 with an annular surface directed, at least in part, axially upwardly. A first upper air port 162 is provided on the stem 151 and extends radially through the wall 152 of the stem 151 into the passageway 153. The first upper air port 162 is on the stem 151 above the lower air sealing disc 156. In FIG. 8 as shown, two such first upper air ports 162 are provided at diametrically opposed positions on the stem 151, however, only one is necessary. The radially outwardly directed surface 158 of the wall 152 of the stem 151 is cylindrical over a cylindrical portion 163 between the first lower air sealing disc 156 and the upper end 155.

The first upper air piston 250 has an elongate tubular stem 251 with a tubular wall 252. The stem 251 of the first upper air piston 250 has a lower end 254 and an upper end 255. The tubular wall 252 defines a central passageway 253 longitudinally therethrough from the lower end 254 to the upper end 255 open at each end. The first upper air piston 250 carries a first upper air sealing disc 256 which extends radially outwardly and axially downwardly from the stem 251 to an annular distal edge 257. Proximate the upper end 255, a radially outwardly directed surface 258 of the wall 252 of the stem 251 carries a radially outwardly extending catching shoulder 259 with an annular surface directed at least in part axially downwardly. Proximate the lower end 254, the stem 251 carries a socket 260 with radially inwardly extending catch shoulder 261 with an annular surface directed at least in part axially upwardly. A second upper air port 262 is provided on the stem 251 and extends radially through the wall 252 of the stem 251 into the passageway 253. The second upper air port 262 is on the stem 251 above the first upper air sealing disc 256. The radially outwardly directed surface 258 of the wall 252 of the stem 251 is cylindrical over a cylindrical portion 263 between the first upper air sealing disc 256 and the upper end 255.

The second upper air piston 350 has an elongate tubular stem 351 with a tubular wall 352. The stem 351 of the second upper air piston 350 has a lower end 354 and an upper end 355. The tubular wall 352 defines a central passageway 353 longitudinally therethrough from the lower end 354 to the upper end 355 open at each end. The second upper air piston 350 carries a second upper air sealing disc 356 which extends radially outwardly and axially downwardly from the stem 351 to an annular distal edge 357. Proximate the upper end 355, a radially outwardly directed surface 358 of the wall 352 of the stem 351 carries a radially outwardly extending catching shoulder 359 with an annular surface directed at least in part axially downwardly. Proximate the lower end 354, the stem 351 carries a socket 360 with radially inwardly extending catch shoulder 361 with an annular surface directed at least in part axially upwardly. The radially outwardly directed surface 358 of the wall 352 of the stem 351 is cylindrical over a cylindrical portion 363 between the second upper air sealing disc 356 and the upper end 355.

The upper end 155 of the lower air piston 150 is adapted to be secured in a snap-fit relation against removal in the socket 260 of the first upper air piston 250 to secure the lower air piston 150 to the first upper air piston 250 with the catching shoulder 159 of the lower air piston 150 in opposition to the catch shoulder 261 of the socket 260 of the first upper air piston 250. Similarly, the upper end 255 of the first upper air piston 250 is adapted to be secured in a snap-fit relation against removal in the socket 360 of the second upper air piston 350 to secure the first upper air piston 250 to the second upper air piston 350 with the catching surface 259 of the first upper air piston 250 in opposition to the catch shoulder 361 of the socket 360 of the second upper air piston 350.

The liquid piston 130 has an elongate tubular stem 131 with a tubular wall 132. The stem 131 of the liquid piston 130 has a lower end 134 and an upper end 135. The tubular wall 132 defines a central passageway 133 longitudinally therethrough from the lower end 134 to the upper end 135. The passageway 133 is open at the upper end 135. The passageway 133 is closed at the lower end 134 by an end wall 136.

Proximate the upper end 135, a radially outwardly directed surface 137 of the wall 132 of the stem 131 carries a radially outwardly extending catching shoulder 138 with an annular surface directed, at least in part, axially downwardly. The upper end 135 of the liquid piston 130 is adapted to be secured in a snap-fit relation against removal in the socket 160 of the lower air piston 150 to secure the liquid piston 130 to the lower air piston 150 with the catching shoulder 138 of the liquid piston 130 in opposition to the catch shoulder 161 of the socket 160 of the lower air piston 150.

The liquid piston 130 carries proximate its lower end 134, a radially outwardly extending liquid sealing disc 139. The lower liquid piston 130 carries proximate its lower end 134, a radially outwardly extending second lower air sealing disc 140 spaced axially upwardly from the liquid sealing disc 139. A liquid port 141 is provided on the stem 131 axially between the liquid sealing disc 139 and the second lower air sealing disc 140. The liquid port 141 extends radially through the wall 132 of the stem 131 into the passageway 131. A lower air port 142 is provided on the stem 131 above the lower air disc 142. The lower air port 142 extends radially through the wall 132 of the stem 131 into the passageway 131.

Over a cylindrical portion 143 between lower air port 142 and the upper end 135, the radially outwardly directed surface 137 of the wall 132 of the stem 131 is cylindrical.

The head 41 comprises a top portion 42 from which an outer tube 43 extends about the axis 23 downwardly to an open lower end 44. The top portion 42 has an upper surface 46 and a lower surface 47. An inner tube 48 extends downwardly from the lower surface 47 coaxially about the axis 23 to an open lower end 62. Within the inner tube 48, a socket 49 is provided having a catch shoulder 50 with an annular surface directed, at least in part, axially upwardly. A discharge passageway 51 is provided within the head 41 between an opening 52 coaxially within the socket 49 at an upper end of the socket 49 to an opening 53 directed forwardly. The outlet tube 40 is a hollow tube with a tube passageway 54 therethrough from a first end 55 to a second forward end 56 providing the discharge outlet 17. The outlet tube 40 is coupled to the top portion 42 with the first end 55 secured within the opening 53.

On the head 41, a downwardly opening annular groove 57 is provided in the lower surface 47 coaxially between the outer tube 43 and the inner tube 48 with a blind upper end 58 to receive an upper end 59 of the spring 21. On the housing 31, an upwardly opening annular groove 60 is provided coaxially between the outer tube 401 and the inner tube 407 with a blind upper end 61 on the annular flange 406 to receive a lower end 62 of the spring 21. In the assembled piston-forming element as seen in FIG. 7, a passageway 63 extends therethrough from the lower end 135 to the discharge outlet 17 including the central passageways 133, 153, 253 and 353, the socket 49, the discharge passageway 51 and the tube passageway 54.

The assembled piston-forming element 22 has an elongate tubular stem 90 formed by the stems 131, 151, 251 and 351 with the central passageway 63 longitudinally therethrough including the passageways 133, 153, 253 and 353. The passageway 63 extends from a lower end 134 of the passageway 133 to an upper end 355 of the passageway 353.

The upper end 355 of the second upper air piston 350 is adapted to be secured in a snap-fit relation against removal in the socket 49 of the head 41 to secure the second upper air piston 350 to the head 41 with the catching surface 359 of the second upper air piston 350 in opposition to the catch shoulder 50 of the socket 49 of the head 41. The foam producing member 464 is located within the socket 49 and sandwiched between the upper end of the socket 49 and the upper end 355 of the upper air piston 350 axially upwardly of the upper end 355.

Air and liquid passing outwardly through the passageway 63 passes through the foam producing member 464 to create a foam of air and liquid as, for example, by creating turbulence in the fluids as they pass through the foam producing member 464. The foam producing member 464 may preferably comprise a screen member with suitably sized openings.

Figure 2:
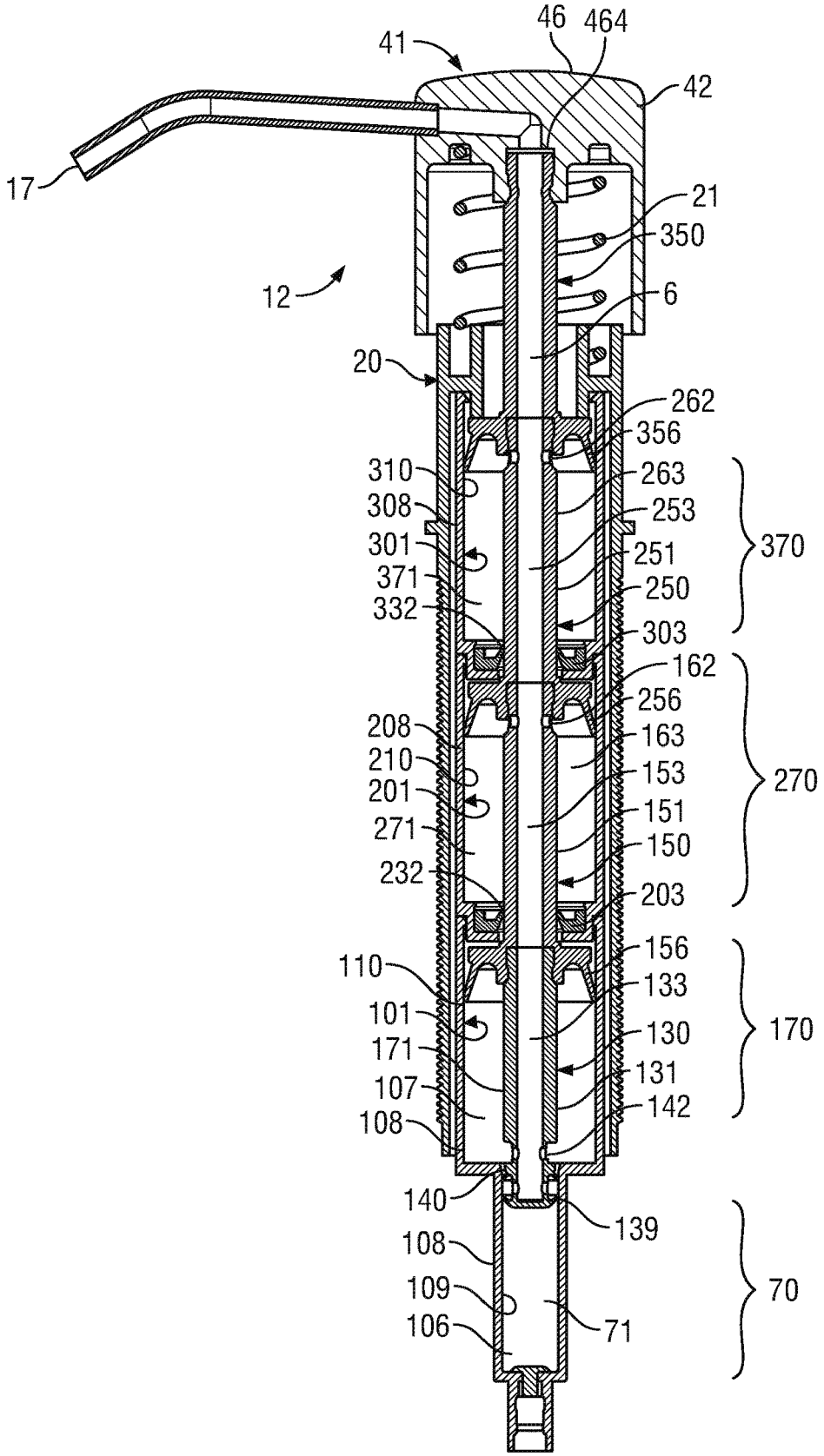
FIG. 2 is an enlarged side view of the pump of FIG. 1 in the extended position.
Figure 3:
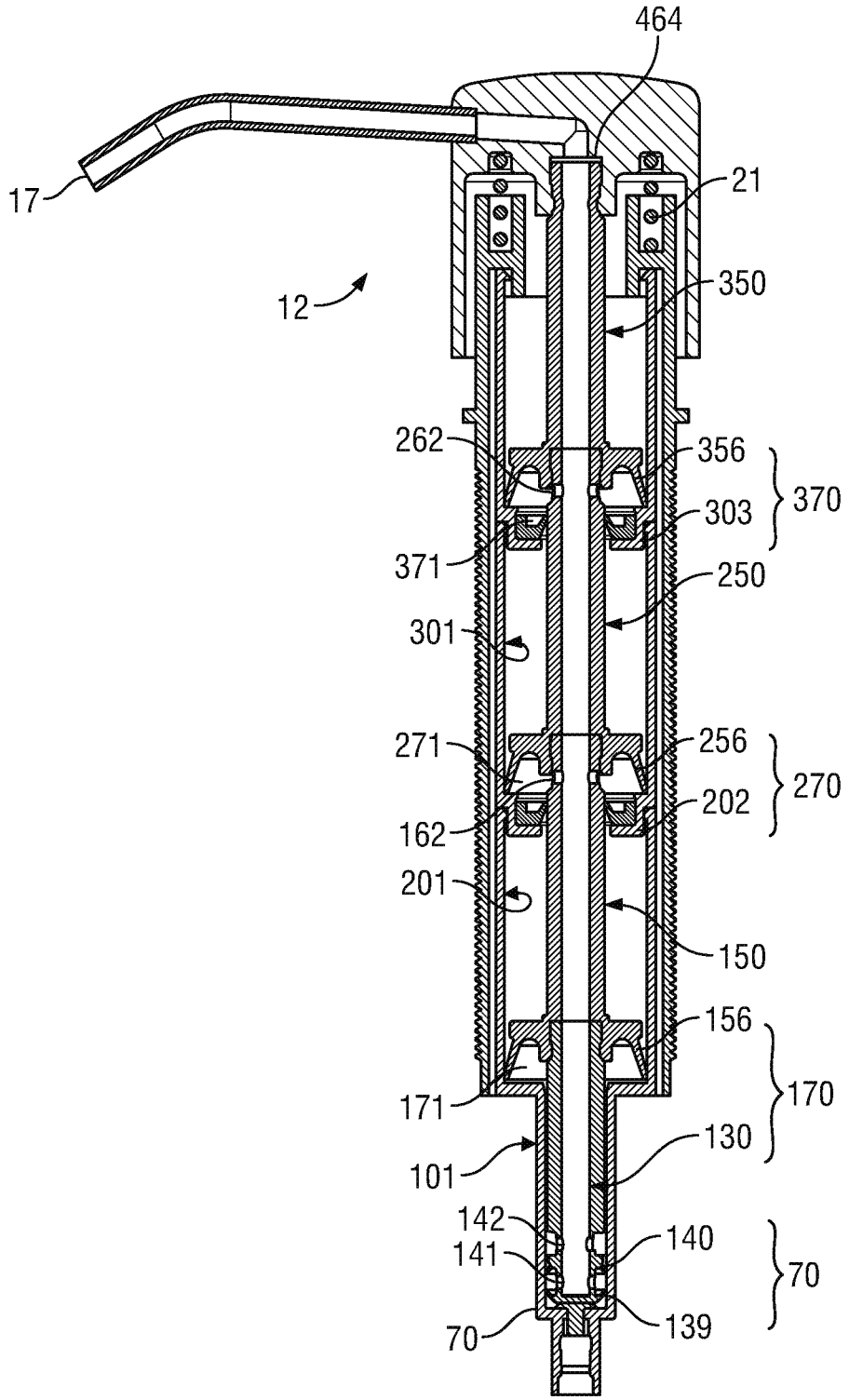
FIG. 3 is a side view the same as FIG. 2 but showing the pump in a retracted condition.

Reference is made to FIGS. 1 and 2 which show the assembled pump 12 in an extended position with the piston-forming element 22 engaged with the piston chamber-forming member 20. The spring 21 is in its inherent unbiased position. In use, from the position of FIGS. 1 and 2, a user manually applies downwardly directed forces to the upper surface 46 of the top portion 42 of the head 41 to axially compress the spring 21 against its inherent bias and move the piston-forming element 22 coaxially downwardly along the central axis 23 relative to the piston chamber-forming member 20 to the retracted position as shown in FIG. 3. The spring 21 has an inherent bias and from the retracted position of FIG. 3 on release of the manual pressure, the spring 21 will move the piston-forming element 22 upwardly from the retracted position of FIG. 3 to the extended position of FIG. 2. As seen in FIG. 5, the outer tube 401 of the piston chamber-forming member has a radially outwardly extending annular flange 427 which, as seen in FIG. 1, engages the uppermost end of the neck 15 of the reservoir 13 to prevent downward movement of the piston chamber-forming member 20 relative to the countertop 16 and the reservoir 13. A cycle of operation arises in the relevant movement of the piston-forming element 22 from the extended position of FIG. 2 to the retracted position of FIG. 3 in a retraction stroke and then from the retracted position of FIG. 3 to the extended position of FIG. 2 in a withdrawal or extension stroke. In the assembled pump 10, as seen in FIGS. 2 and 3, the cylindrical portion 263 of the stem 251 of the first upper air piston 250 passes through the second annular seal disc 303 with the annular distal end 332 of the annular sealing flange 331 engaging the cylindrical portion 263 of the stem 251 to form a seal therewith preventing fluid flow therepast axially downwardly.

The second upper air sealing disc 356 of the second upper air piston 350 engages the radially inwardly directed cylindrical surface of the cylindrical upper portion 310 of the second upper casing 301 forming a seal therewith to prevent fluid flow axially upwardly therepast. A second upper air pump 370 is thereby formed within the second upper casing 301 between the second upper casing assembly 300 and the piston forming element 22. The second upper air pump 370 provides a cylindrical second upper air compartment 371 radially in between the cylindrical upper portion 310 of the wall 308 of the second upper casing 301 and the stem 251 of the first upper air piston 250 and axially between the first upper air sealing disc 356 and the second annular seal disc 303. The second upper air port 262 provides communication between the second upper air compartment 371 and the passageway 253.

The volume of the second upper air compartment 371 varies with relative movement of the piston-forming element 22 relative to the piston chamber-forming member 20 with the volume being largest in the extended position of FIG. 2 and smallest in the retracted position of FIG. 3. In a retraction stroke in moving from the extended position of FIG. 2 to the retracted position of FIG. 3 the volume of the second upper air compartment 371 decreases and fluid therein, typically substantially air, is compressed and forced out of the second upper air port 262 into the passageway 253 and hence out the discharge outlet 17. In a withdrawal stroke the volume of the second upper air compartment 371 increases and, fluid is drawn via the discharge outlet 17 into the passageway 253 and via the second upper air port 262 into the second upper air compartment 371.

In the assembled pump 10, as seen in FIGS. 2 and 3, the cylindrical portion 163 of the stem 151 of the lower air piston 150 passes through the first annular seal disc 203 with the annular distal end 232 of the annular sealing flange 231 engaging the cylindrical portion 163 of the stem 151 to form a seal therewith preventing fluid flow therepast axially downwardly.

The first upper air sealing disc 256 of the first upper air piston 250 engages the radially inwardly directed cylindrical surface of the cylindrical upper portion 210 of the first upper casing 201 forming a seal therewith to prevent fluid flow axially upwardly therepast. A first upper air pump 270 is thereby formed within the first upper casing 201 between the first upper casing assembly 200 and the piston forming element 22. The first upper air pump 270 provides a cylindrical first upper air compartment 271 radially in between the cylindrical upper portion 210 of the wall 208 of the first upper casing 201 and the stem 151 of the lower air piston 150 and axially between the upper air sealing disc 256 and the first annular seal disc 203. The first upper air port 162 provides communication between the first upper air compartment 271 and the passageway 153.

The volume of the first upper air compartment 271 varies with relative movement of the piston-forming element 22 relative to the piston chamber-forming member 20 with the volume being largest in the extended position of FIG. 2 and smallest in the extended position of FIG. 3. In a retraction stroke in moving from the extended position of FIG. 2 to the retracted position of FIG. 3 the volume of the first upper air compartment 271 increases and, fluid therein, typically substantially air, is compressed and forced out of the first upper air port 162 into the passageway 153 and hence out the discharge outlet 17. In a withdrawal stroke the volume of the second upper air compartment 271 increases and fluid is drawn via the discharge outlet 17 into the passageway 153 and via the first upper air port 162 into the first upper air compartment 271.

The lower air sealing disc 156 of the lower air piston 150 extends radially outwardly to sealably engage with the radially inwardly directed surface of the wall 108 of the lower casing 101 in the cylindrical second lower portion 110 within the lower air chamber 107. The second lower air sealing disc 140 extends radially outwardly to sealably engage the wall 108 of the lower casing 101 in the cylindrical first lower portion 109 within the liquid chamber 106. A lower air pump 170 is defined within the lower casing 101 between the lower air piston 150 and the lower casing 101. The lower air pump 170 has an annular lower air compartment 171 which extends radially between the wall 108 of the lower casing 101 and the stem 151 of the lower air piston 150 and axially between the first lower air sealing disc 156 and the second lower air sealing disc 140. The lower air port 142 provides communication between the lower air compartment 171 and the central passageway 133. The lower air compartment 171 has a volume which varies as the piston-forming element 22 moved axially relative to the piston chamber-forming member 20. The lower air compartment 171 has a largest volume in the extended position of FIG. 2 and a smallest volume in the retracted position of FIG. 3 with this volume decreasing with movement of the piston-forming element 22 axially downwardly since the lower air compartment 171 is formed within a stepped chamber formed by the lower air chamber 107 and the lesser diameter liquid chamber 106.

Figure 10:
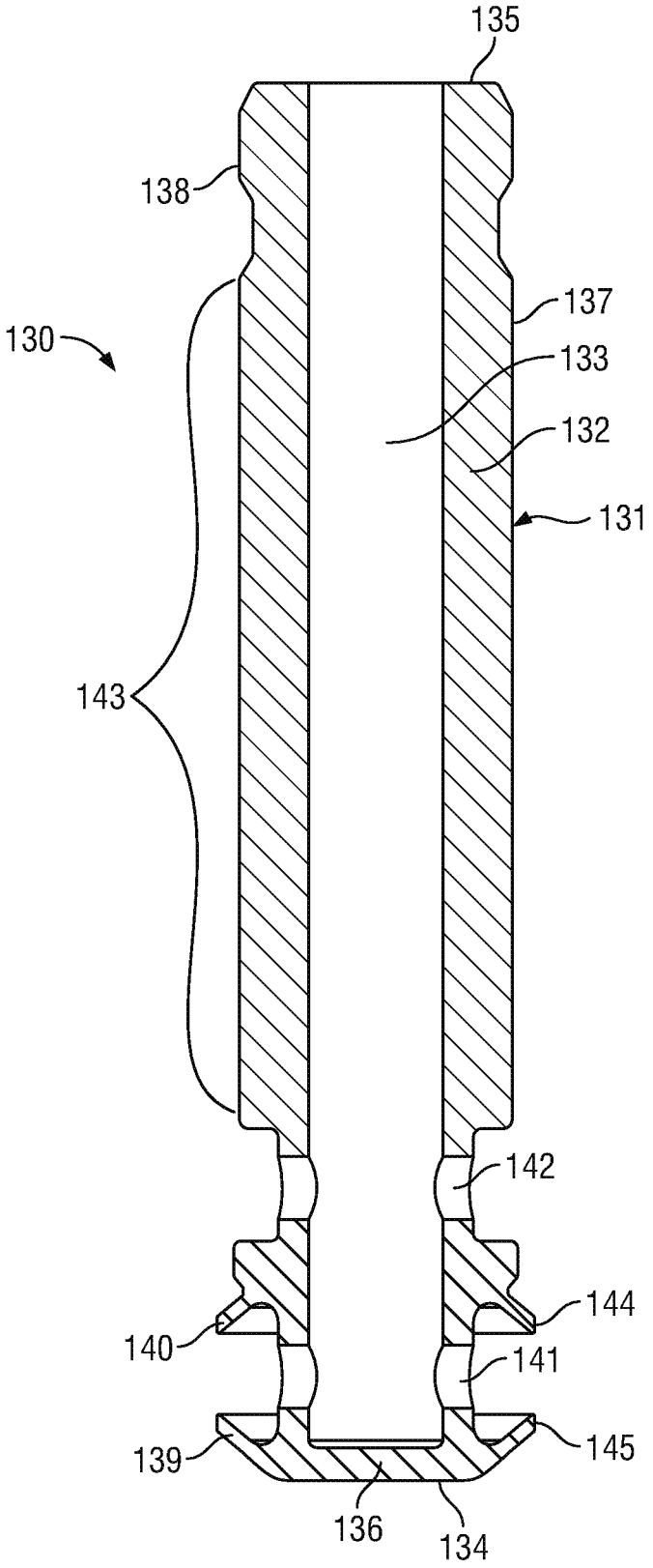
FIG. 10 is an enlarged pictorial view of the liquid piston of the piston-forming element shown in FIG. 8.
Figure 11:
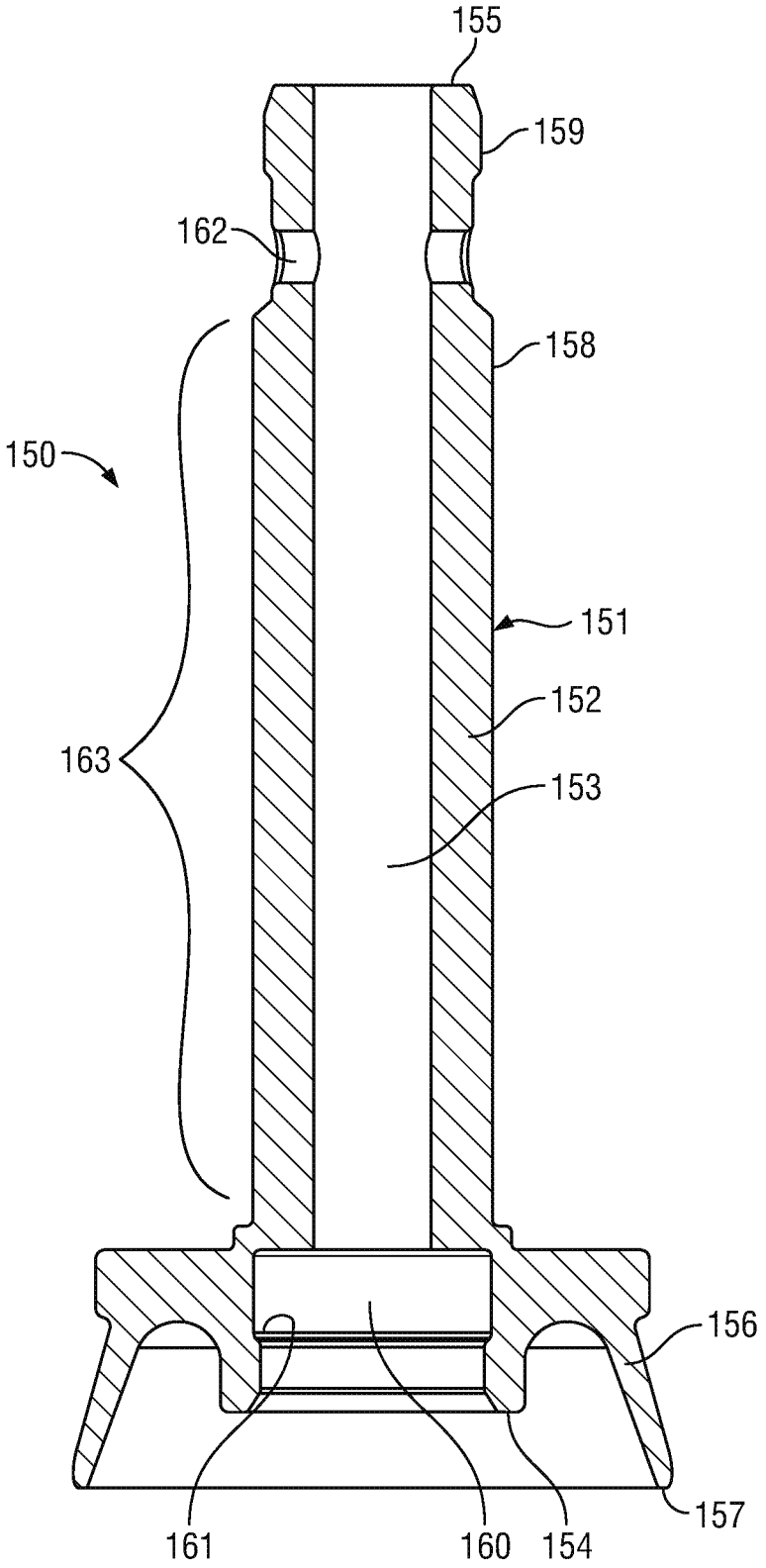
FIG. 11 is an enlarged pictorial view of one of the air piston portions of the piston-forming element shown in FIG. 8.

The liquid sealing disc 139 extends radially outwardly from the liquid piston 130 into engagement with the wall 108 of the lower casing 101 within the cylindrical first lower portion 109 of the liquid chamber 106. The liquid sealing disc 139 extends radially outwardly to a distal end 145. The liquid sealing disc 139 extends axially inwardly as it extends radially outwardly to the distal end 145 as seen in FIG. 10. The liquid sealing disc 139 is resilient adopting an unbiased inherent condition as seen in FIG. 10 which preferably biases the distal end 143 of the liquid sealing disc 139 into the wall 108 of the cylindrical first lower portion 109 of the liquid chamber 106. The liquid sealing disc 139 can be deflected against this bias away from the wall 108 to permit fluid flow upwardly therepast. As seen in FIG. 10, the lower air sealing disc 140 extends radially outwardly to a distal end 144 which engages the wall 108 of the lower casing 101 in the cylindrical first lower portion 109 forming the liquid chamber 106 and substantially prevents liquid flow axially upwardly past the lower air sealing disc 140. A liquid pump 70 is formed within the liquid chamber 106 between the stem 131 of the liquid piston 130 and the cylindrical first lower portion 109 of the lower casing 101 within the liquid chamber 106. The liquid pump 70 has a liquid compartment 71 defined within the liquid chamber 106 between one-way valve 102 and the lower end 134 of the liquid piston 130. The volume of the liquid compartment 71 varies with relative movement of the piston-forming element 22 within the piston chamber-forming member 20 with the volume being greatest in the extended position of FIG. 2 and least in the retracted position of FIG. 3. On movement of the liquid piston 130 from the extended position of FIG. 2 to the retracted position of FIG. 3, the volume of the liquid compartment 71 reduces compressing liquid within the liquid compartment 71 closing the one-way valve 102 to fluid flow downwardly from the liquid compartment 71 and with the pressure in the liquid compartment 71 deflecting the liquid sealing disc 139 for liquid flow upwardly past the liquid sealing disc 139 into an annular compartment between the annular sealing disc 139 and the second lower air sealing disc 140 and via the liquid port 141 into the central passageway 133 in a retraction stroke. In a withdrawal stroke, the volume of the liquid compartment 71 increases reducing the pressure within the liquid compartment 71 and drawing liquid from the reservoir past the one-way valve 102 into the liquid compartment 71.

In the first embodiment illustrated in FIGS. 1 to 11, each of the liquid pump 70, the lower air pump 170, the first upper air pump 270 and the second upper air pump 370 are all in phase such that they, in a retraction stroke, simultaneously discharge fluid from their respective compartments and, in a retraction stroke, simultaneously draw fluid into their respective compartments. Thus, for example, advantageously in a retraction stroke, a unit dosage of liquid is discharged into the passageway 63 by the liquid pump 70 and, simultaneously, a volume of air is discharged from each of the air pumps 170, 270 and 370 so as to provide for the discharge of liquid and air simultaneously through the air forming member 464 forming foam which is discharged out the discharge outlet 17.

In a withdrawal stroke, fluid, notably air, is withdrawn from the discharge outlet 17 through the passageway 63 and into each of the second upper air compartment 371, the first upper air compartment 271 and lower air compartment 171 simultaneously with fluid being drawn into the liquid compartment 71 from the reservoir.

Figure 12:
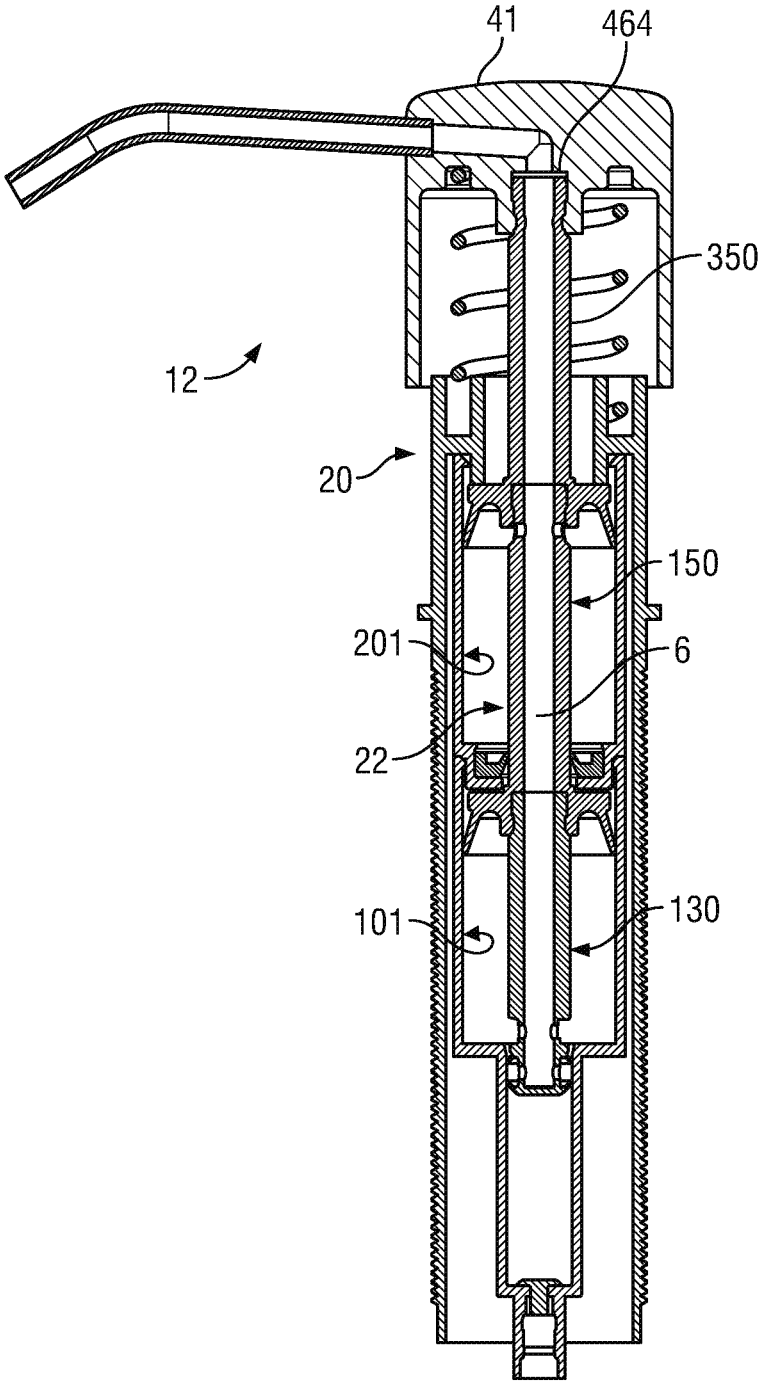
FIG. 12 is a side view of a foam pump in accordance with a second embodiment of the present invention in an extended position.

Reference is made to FIG. 12 which illustrates a second embodiment of a pump 10 in accordance with the present invention which is identical to the pump of the first embodiment, however, with the exception that the second upper air pump 370 has been eliminated by elimination from the pump 10 of the first embodiment as seen in FIG. 2 of the second upper casing assembly 300 and the first upper air piston 250.

Figure 13:
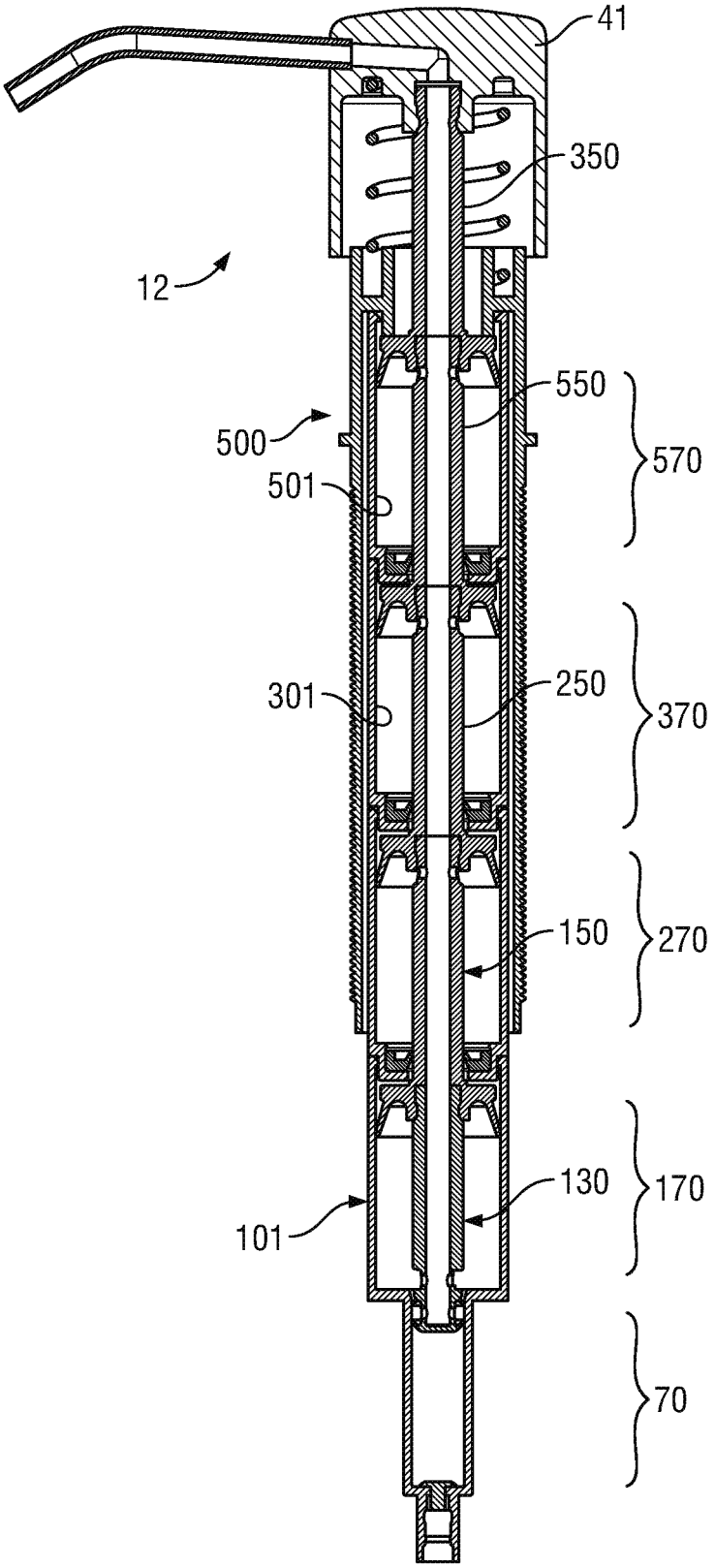
FIG. 13 is a side view of a foam pump in accordance with a third embodiment of the present invention in an extended position.

Reference is made to FIG. 13 which illustrates a third embodiment of a pump 10 in accordance with the present invention which is identical to the pump illustrated in FIG. 2, however, in which a third upper air pump 570 is provided by providing a third upper casing assembly 500 with a third upper casing 501 and a third upper air piston 550 which are modular and substantially the same as, respectively, the second upper casing assembly 300 and the first upper air piston 250.

A feature of the invention is that the pumps are configured to be made from modular components. The first upper casing assembly 200 and the second upper casing assembly 300 are identical in their casings 201 and 301 and in their first and second upper annular seal disc 203 and 303. The lower air piston 150 and the first upper air piston 250 are identical. The second upper air piston 350 is identical to the lower air piston 150 with the exception that there is no equivalent on the second upper air piston 350 to the air port 162. The second air piston 350 can be identical to the lower air piston 150 by firstly providing the second air piston 350 with an air port, not shown, identical to the air port 162 and, secondly, providing the head 41 to engage the second air piston 350 in a manner to sealably close the air port on the second air piston 350, as can be accomplished by suitable modification of the socket 49 of the head 41. The use of modular components for the casing assembly and piston for air pumps permits pump arrangements with one, two or three identical upper air pumps to be assembled from modular components as is apparent from a comparison of the embodiments of FIGS. 2, 12 and 13. Each of these embodiments provided have a constant diameter exterior about the upper air pumps.

Figure 14:
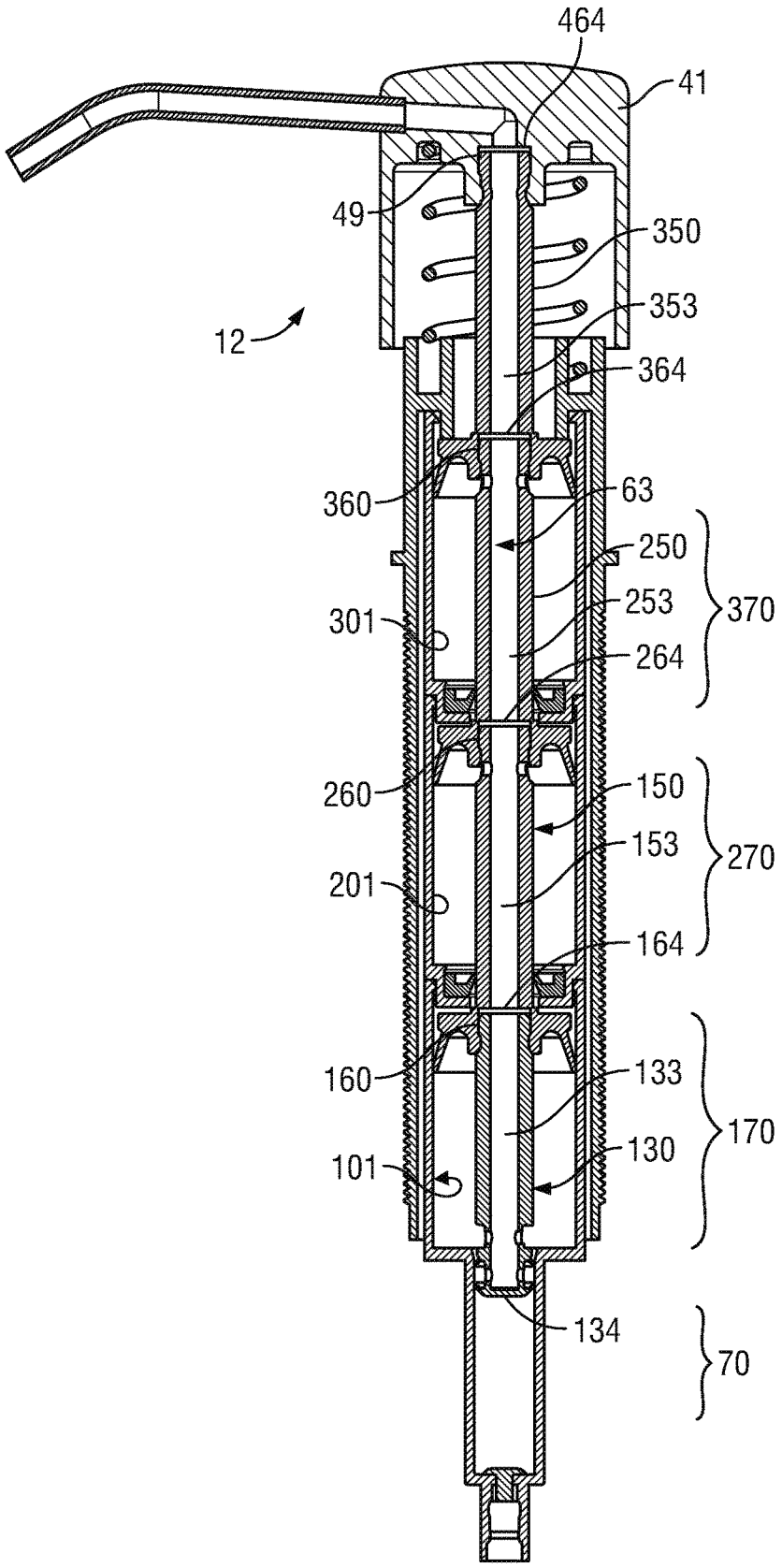
FIG. 14 is a side view of a foam pump in accordance with a fourth embodiment of the present invention in an extended position.

Reference is made to FIG. 14 which illustrates a fourth embodiment of a piston pump 10 in accordance with the present invention which is identical to the piston pump as shown in FIG. 2 but for two exceptions. A first exception is that while in FIG. 2 the diameter of each of the central passageways 133, 153, 253 and 353 are identical and equal, in FIG. 14, the diameter of the passageway 63 changes varies between the lower end 134 and the upper end of the central passageway 353 of the second upper air pump 350, with the variation being an increase in diameter as the passageway 63 extends upwardly. The second exception is that in addition to the foam producing member 464 within the socket 49 of the head 41, a foam producing member 364 is provided within the socket 360 of the second upper air piston 350, a foam producing member 264 is provided within the socket 260 of the first upper air piston 250 and a foam producing member 164 is provided within the socket 160 of the lower air piston 150. In operation of the pump of FIG. 14 in a retraction stroke, liquid from the liquid pump 70 and air from the first air pump 170 are passed through the foam producing member 164 to produce at least some foam as a first resultant product which is joined from air from the first upper air pump 270 and passed through the foam producing member 264 forming a second resultant foamed product which, together with air from the second upper air pump 370, is passed first through the foam producing member 364 and then through the foam producing member 464 to produce a final resultant foam product which is delivered to the discharge outlet 17. The arrangement of FIG. 14 with four foam producing members 164, 264, 364 and 464 provides for successive partial foaming of the air and fluid passing through each of the foam producing members. This is believed to be preferred for providing foam of desired characteristics. The increase in diameter and therefore the relative cross-sectional area of the passageway 66 axially upwardly can assist in adjusting the relative velocity of the fluid through the passageway 66 with a relative reduction in velocity compared to velocities which would arise in the arrangement in FIG. 2 as the fluid extends axially upwardly.

Figure 15:
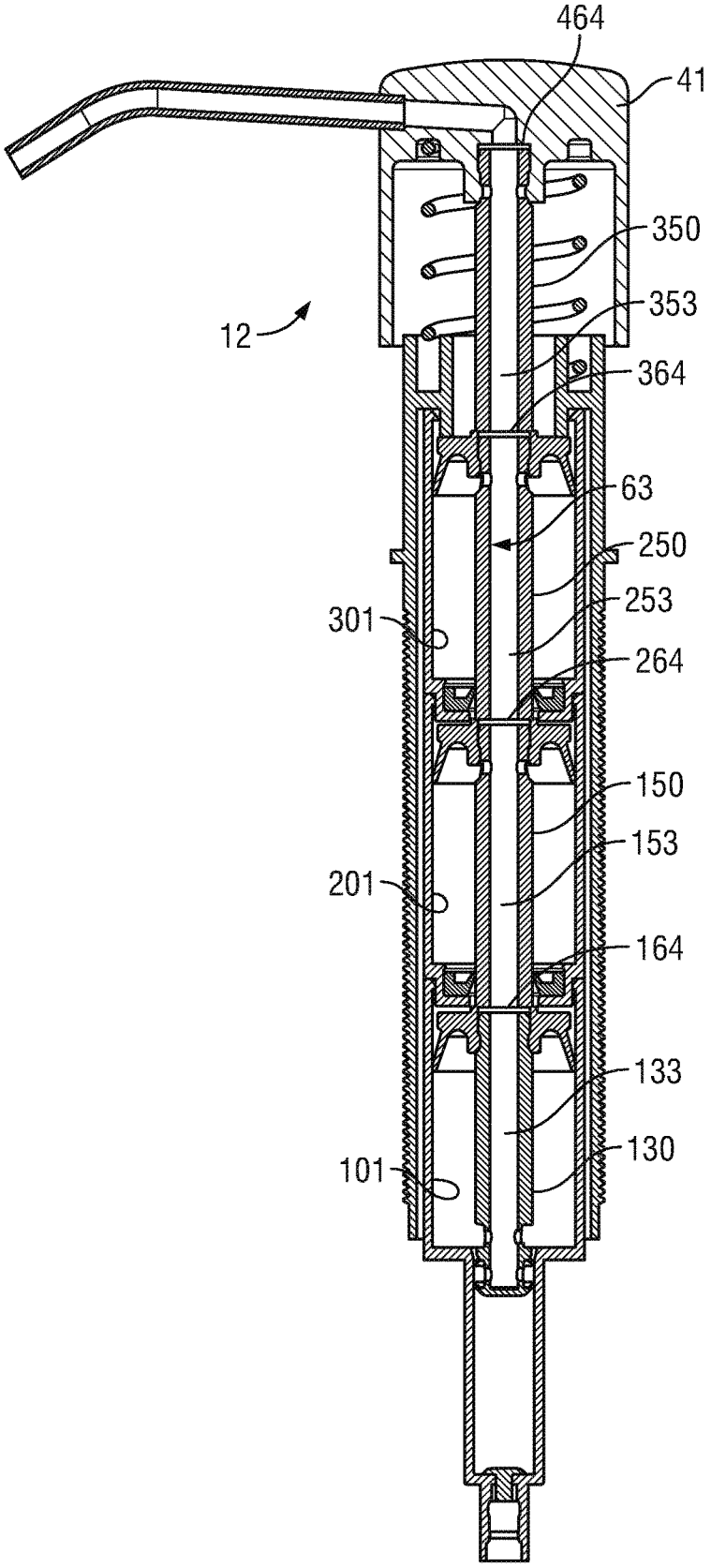
FIG. 15 is a side view of a foam pump in accordance with a fifth embodiment of the present invention in an extended position.

Reference is made to FIG. 15 which illustrates a fifth embodiment in accordance with the present invention which is identical to the embodiment of FIG. 14 with the exception that the diameter and therefore the cross-sectional area of the passageway 133 increases axially upwardly and above the passageway 133, the passageway 63 decreases in diameter and, therefore, the cross-sectional area decreases axially upwardly successively through the central passageways 153, 253 and 353. In accordance with the present invention by a selection to use one or more of the foam producing members 164, 264, 354 and 464, a selection of characteristics for each foam producing member used and a selection of the relative diameter for the passageway 63 and changes in the diameter along the length of the passageway 63, advantageous configurations may be selected having regard to the relative velocity of fluid through the passageway at any location and the relative nature of the foam producing members. For example, it is believed to be desired that the relative opening size through the foam producing member is largest in the lower foam producing member 164 and the relative opening size is preferably to successively decrease to be smallest in the uppermost foam producing member 464. While the embodiments of FIGS. 14 and 15 show four foam producing members 164, 264, 364 and 464, it is to be understood that, alternatively, only one, two or three such foam producing members may be provided.

Figure 16:
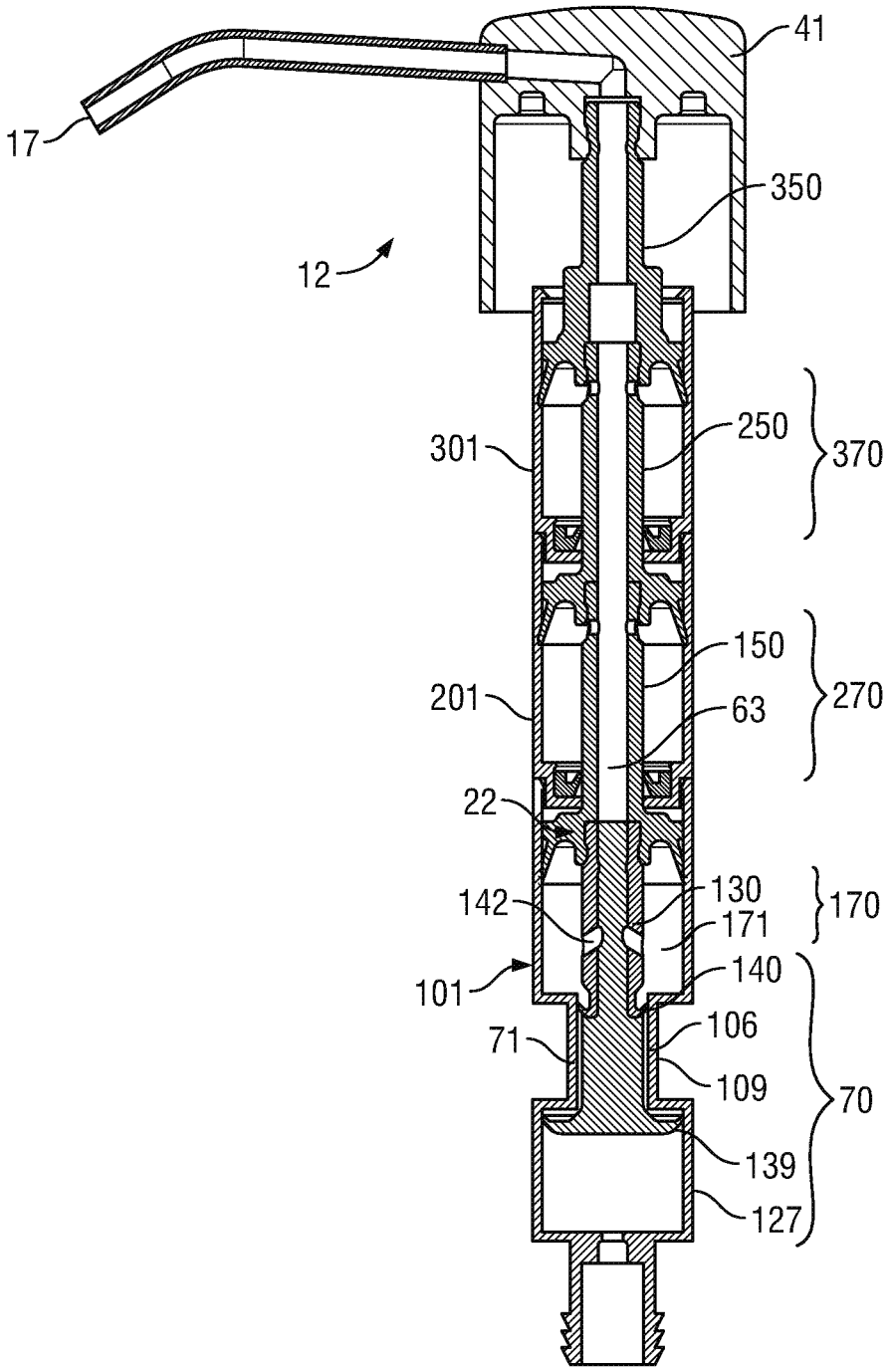
FIG. 16 is a side view of a foam pump in accordance with a sixth embodiment of the present invention in an extended position.

Reference is made to FIG. 16 which illustrates a sixth embodiment of a foam pump in accordance with the present invention. In FIG. 16, the lower casing 101 has a liquid chamber 106 defined within a cylindrical second lower portion 109 and a cylindrical third lower portion 127 of a larger diameter than the cylindrical second lower portion 109. The liquid sealing disc 139 is within the enlarged diameter second lower portion 109 while the lower air sealing disc 140 is within the lesser diameter cylindrical lower portion 109. With movement of the piston-forming element 22 downwardly in a retraction stroke, the volume of the liquid compartment 71 between the second lower air sealing disc 140 and the liquid sealing disc 139 increases to draw liquid in from the reservoir and, in the withdrawal stroke, the volume in the liquid compartment 71 decreases deflecting the second lower air sealing disc 140 radially inwardly and axially upwardly such that liquid flows upwardly past the second lower air sealing disc 140 into the lower air compartment 171. From the lower air compartment 171 via the lower air port 142, liquid and air within the lower air compartment 171 are urged in a retraction stroke into the passageway 63 for discharge out the discharge outlet 17. In the embodiment of FIG. 16, the liquid pump 70 is out of phase with the air pumps 170, 270 and 370 in the sense that in a retraction stroke, each of the air pumps is discharging fluid into the passageway 66 whereas the liquid pump 70 is drawing liquid into the liquid compartment 71 from the reservoir and, in a withdrawal stroke, the liquid pump 70 is discharging fluid into the lower air compartment 171 while each of the air pumps 170, 270 and 370 is drawing air from the atmosphere into their respective air compartments 171, 271 and 371.

The particular nature of the liquid pump 70 for use in various embodiments is not limited and the liquid pump 70 may have valves as illustrated in the embodiment of FIG. 1 or a stepped chamber as illustrated in FIG. 16 and may be in phase or out of phase with each of the air pumps. Each of the air pumps is shown to be coaxially aligned and operate in phase simultaneously.

In the preferred embodiment, air which is drawn into each of the air pumps is atmospheric air drawn from the atmosphere via the discharge outlet 17. This is not necessary. Various arrangements may be provided for atmospheric air to enter the air compartments in a retraction stroke without passing through the discharge outlet. For example, an arrangement for an air inlet valve could be provided as in the manner disclosed in U.S. Pat. No. 7,337,930 to Ophardt et al, issued Mar. 4, 2008.

Figure 17:
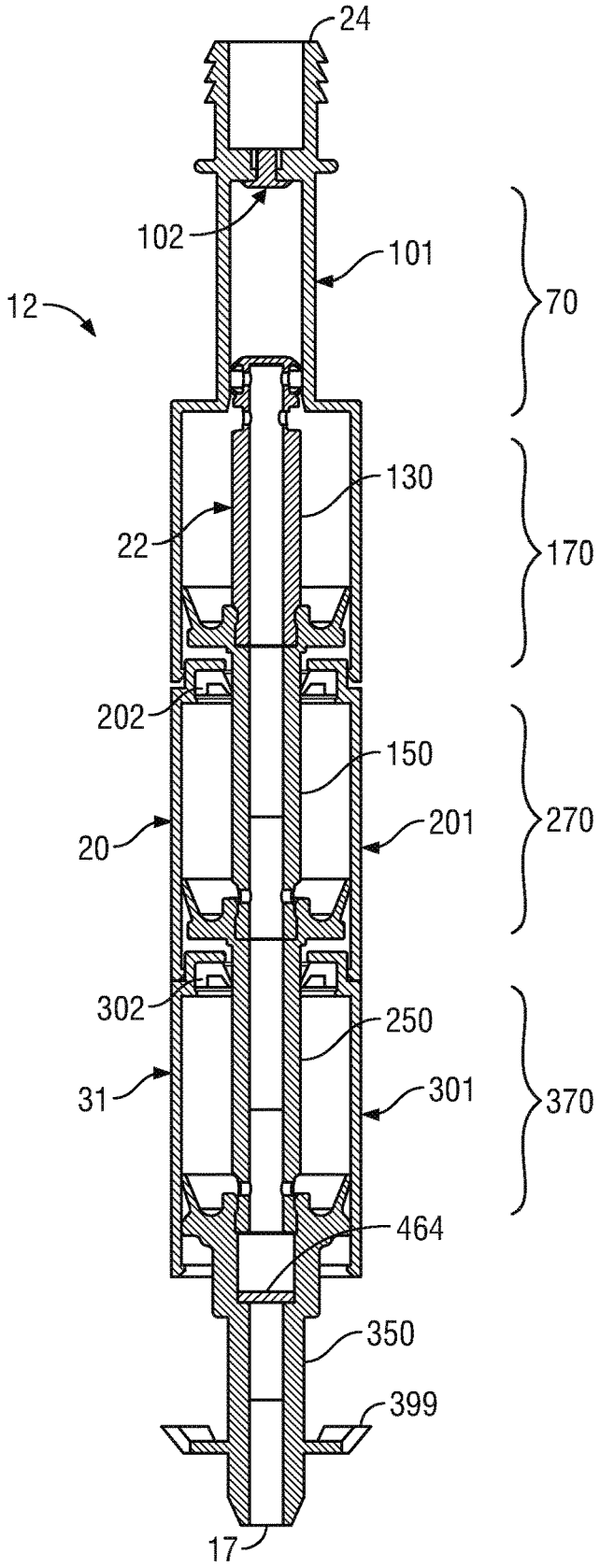
FIG. 17 is a side view of a foam pump in accordance with a seventh embodiment of the present invention in an extended position.

The embodiments of FIGS. 1 to 16 illustrate arrangements which pump liquid upwardly from the reservoir 13, that is, from the lower end 24 of the piston chamber-forming member 20 upwardly. Reference is made to FIG. 17 which illustrates a seventh embodiment in which the pump 12 pumps liquid downwardly. In FIG. 17, similar reference numerals are used to identify equivalent elements in FIGS. 1 to 16.

The seventh embodiment of FIG. 17 consists of an arrangement in which the pump 12 is the same as the pump 12 in the first embodiment of FIGS. 2 to 11, but with the exceptions that pump 12 is inverted so that the end 24 of the piston chamber-forming member 20 is an upper end, both the head 41 and the tube 40 are eliminated, the air piston 350 is modified to provide the discharge outlet 17 at a lower end, and the air piston 350 is modified to carry an engagement flange 399 for engagement to slide the piston-forming element 22 relative the piston chamber-forming member 20. With the end 24 in communication with liquid as in a liquid reservoir, such as an inverted bottle, not shown, liquid from the reservoir is dispensed downwardly by the liquid pump 70 simultaneously with the air pumps 170, 270 and 370 discharging air to pass with the liquid downwardly through the foam producing member 436 and out the discharge outlet 17. The pump 12 of FIG. 17 may have its housing 31 extend upwardly into a liquid containing reservoir, however, this is not necessary. As was the case with the pumps of this invention which dispense liquid upwardly, many different configurations of the liquid pump 70 may be used in downwardly dispensing pumps in substitution of the liquid pump 70 shown. Downwardly dispensing liquid pumps are known as taught, for example, in U.S. Pat. No. 5,165,577 to Ophardt, issued Nov. 24, 1992, the disclosure of which is incorporated herein by reference. The preferred embodiments illustrate the pumps 12 as being orientated with the central axis 23 vertical in each of the embodiments of FIGS. 1 to 17. This is not necessary. In accordance with the present invention, the central axis 23 may be orientated to be horizontal or any angle between horizontal and vertical.

In the embodiments of FIGS. 1 to 16, the terms "upper" and "lower" and "above" and "below" are used to describe the various orientations and in the names of elements with as considered axially along the axis relative the direction that fluid is dispensed from a reservoir such that "up" means "outer" and "down" means "inner" as seen in FIGS. 1 to 16.

However, in FIG. 17, the reverse applies with as considered axially along the axis relative the direction that fluid is dispensed from a reservoir such that "up" means "inner" and "down" means "outer" as seen in FIG. 17. In the embodiments of FIGS. 1 to 16, in referring to the various orientations and elements, the following words have the same meaning and may be substituted:

above=axially outwardly of
below=axially inwardly of
upper=outer
lower=inner
downwardly=axially inwardly
upwardly=axially outwardly.

For example, the lower end 24 may be referred to as the inner end 24, and the first upper casing 201 may be referred to as the first outer casing 201.

While the invention has been described with reference to preferred embodiments, many variations and modifications may now occur to a person skilled in the art. For a definition of the invention, reference is made to the following claims.

We claim:

1. A piston pump comprising:

a piston chamber-forming member (20) extending longitudinally about an axis (23) from an inner end (24) to an outer end (25);

the piston chamber-forming member (20) defining a central chamber (26) therein coaxially about the axis within an annular chamber wall (27);

the piston chamber-forming member having a liquid inlet (28) at the inner end (*24*) in communication with a liquid (14) in a reservoir (13);

a piston-forming element (22) coaxially slidably received within the chamber (26) in the piston chamber-forming member (20);

the piston-forming element (22) comprising an elongate tubular stem (90) with a central passageway (63) longitudinally therethrough, the passageway (63) extending from an inner end (134) *of the passageway* (*63*) to an outer end *of the passageway* (*63*);

the piston-forming element (22) coaxially slidable within the piston chamber-forming member (20) between an extended position and a retracted position in a cycle of operation comprising a withdrawal stroke and a retraction stroke to draw the liquid (14) from the reservoir (13) via the liquid inlet (28) and discharge the liquid mixed with air through the outer end of the passageway (63);

a liquid pump (70) formed between the piston chamber-forming member (20) and the piston-forming element (22) proximate the inner end [134] (*24*) of the piston chamber-forming member [22] (*20*), the liquid pump (70) operative in the cycle of operation to draw the liquid from the reservoir (13) via the liquid inlet (28) and discharge the liquid into the passageway (63) proximate the inner end (134) of the passageway (63);

an inner air pump (170) formed between the piston chamber-forming member (20) and the piston-forming element (22) axially outwardly of the liquid pump (70) operative in the cycle of operation in [a] *the* withdrawal stroke to draw air from the atmosphere and in [a] *the* retraction stroke to discharge air into the passageway (63) through an inner air port (142) which extends radially inwardly through the stem (90) into the passageway (63);

a first outer air pump (270) formed between the piston chamber-forming member (20) and the piston-forming element (22) axially outwardly of the inner air pump (170), the first outer air pump (270) operative in the cycle of operation in the withdrawal stroke to draw air from the atmosphere and in the retraction stroke to discharge air into the passageway (63) through a first outer air port (162) which extends radially inwardly through the stem (90) into the passageway [91] (*63*) at an axial location on the stem (90) spaced axially outwardly of the inner air port (142);

a first outer air sealing annular flange [203] (*231*) on the piston chamber-forming member (20) axially outwardly of the inner air pump (170), the first outer air sealing annular flange [203] (*231*) extending from the chamber wall (47) radially inwardly to an annular distal edge (232) in engagement with a radially outwardly directed first outer cylindrical wall (152) on the stem [91] (*90*) axially inwardly of the first outer air port (162);

the annular distal edge (232) of the first outer air sealing annular flange [203] (*231*) engaging the first outer cylindrical wall (152) of the stem [91] (*90*) to prevent fluid flow axially inwardly therepast, a first outer air sealing disc (256) on the stem [91] (*90*) axially outwardly of the first outer air port (162) and axially outwardly of the first outer air sealing annular flange [203] (*231*) on the piston chamber-forming member (20);

the first outer air sealing disc (256) extending radially outwardly from the stem [91] (*90*) to an annular distal edge (257) in engagement with a first cylindrical outer portion (210) of the chamber wall [47] (*27*) on the piston chamber-forming member [22] (*20*) axially outwardly of the first outer air sealing annular flange [203] (*231*);

the annular distal edge (257) of the first outer air sealing disc (256) engaging the first cylindrical outer portion (210) of the chamber wall [47] (*27*) on the piston chamber-forming member (20) to prevent fluid flow axially [upwardly] *outwardly* therepast;

the first outer air pump (270) having a first outer air compartment (271) open to the first outer air port (162) and defined (a) annularly between the stem (90) of the piston-forming element (22) and the first cylindrical outer portion (210) of the chamber wall [47] (*27*) of the piston chamber-forming member (20), and (b) axially between the first outer air sealing annular flange [203] (*231*) and the first outer air sealing disc (256);

in [a] *the* cycle of operation in the withdrawal stroke, an axial distance between the first outer air sealing annular flange [203] (*231*) and the first outer air sealing disc (256) increases thereby increasing a volume of the first outer air compartment (271) and drawing air into the first outer air compartment (271) and, in the [refraction] *retraction* stroke, the axial distance between the first outer air sealing annular flange [203] (*231*) and the first outer air sealing disc (256) decreases thereby decreasing the volume of the first outer air compartment (271) and discharging air from the first outer air compartment (271) through the first outer air port (162) into the passageway (63).

2. A piston pump as claimed in claim 1 wherein:

the liquid pump (70) operative in [a] *the* cycle of operation in the withdrawal stroke to draw *the* liquid from the reservoir (13) via the liquid inlet (28) and, in the retraction stroke, to discharge *the* liquid into the passageway (63) proximate the inner end (134) of the passageway (63).

3. A piston pump as claimed in claim 1 including:

a second outer air pump (370) formed between the piston chamber-forming member (20) and the piston-forming element (22) axially outwardly of the first outer air pump (270), the second outer air pump (370) operative in the cycle of operation in the withdrawal stroke to draw air from the atmosphere and, in the retraction stroke, to discharge air into the passageway (63) through a second outer air port (262) which extends radially inwardly through the stem (90) into the passageway (63) at an axial location on the stem (90) spaced axially outwardly of the first outer air port (162);

a second outer air sealing annular flange [303] (*331*) on the piston chamber-forming member [20 above] (*20*) *axially outwardly of* the first outer air pump (270), the second outer air sealing annular flange [203] (*331*) extending from the chamber wall [47] (*27*) radially inwardly to an annular distal edge (332) in engagement with a radially outwardly directed second outer cylindrical wall (252) on the stem (90) axially outwardly of the second outer air port (262);

the annular distal edge (332) of the second outer air sealing annular flange [303] (*331*) engaging the second outer cylindrical wall (252) of the stem (90) to prevent fluid flow axially inwardly therepast, a second outer air sealing disc (356) on the stem (90) axially outwardly of the second outer air sealing annular flange [303] (*331*) on the piston chamber-forming member (20);

the second outer air sealing disc (356) extending radially outwardly from the stem (90) to an annular distal edge (357) in engagement with a second cylindrical outer portion (310) of the chamber wall [47] (*27*) on the piston chamber-forming member (20) axially outwardly of the second outer air sealing annular flange [303] (*331*);

the annular distal edge (357) of the second outer air sealing disc [256] (*356*) engaging the second cylindrical outer portion (310) of the chamber wall [47] (*27*) on the piston chamber-forming member (20) to prevent fluid flow axially outwardly therepast;

the second outer air pump (370) having a second outer air compartment (371) open to the second outer air port (262) and defined (a) annularly between the stem (90) of the piston-forming element (22) and the second cylindrical outer portion (310) of the chamber wall [47] (*27*) of the piston chamber-forming member (20), and (b) axially between the second outer air sealing annular flange [303] (*331*) and the second outer air sealing disc (356);

in [a] *the* cycle of operation in the withdrawal stroke, an axial distance between the second outer air sealing annular flange [303] (*331*) and the second outer air sealing disc (356) increases thereby increasing a volume of the second outer air compartment (371) and drawing air into the second outer air compartment (371) and, in the retraction stroke, the axial distance between the second outer air sealing annular flange [303] (*331*) and the second outer air sealing disc (356) decreases thereby decreasing the volume of the second outer air compartment (371) and discharging air from the second outer air compartment (371) through the second outer air port (262) into the passageway (63).

4. A piston pump as claimed in claim 3 wherein:

the first cylindrical outer portion (210) of the chamber wall [47] (*27*) on the piston chamber-forming member (20) extends axially between the first outer air sealing annular flange [203] (*231*) and the second outer air sealing annular flange [303] (*331*); and the second cylindrical outer portion (310) of the chamber wall [47] (*27*) on the piston chamber-forming member (20) extends axially outwardly from the second outer air sealing annular flange [303] (*331*).

[5. A piston pump as claimed in claim 4 wherein:

the first outer air sealing annular flange 203 engages the second cylindrical outer portion 210 of the chamber wall 47 on the piston chamber-forming member 20 axially outwardly of the first outer air sealing disc 256 on the stem 90 and axially inwardly of the second outer air sealing disc 356 on the stem 90.]

[6. A piston pump as claimed in claim 5 wherein:

a cylindrical first inner portion 110 of the chamber wall 47 on the piston chamber-forming member 20 extends axially inwardly from the first outer air sealing annular flange 203;

a first inner air sealing disc 156 on the stem 90 axially inwardly of the first outwardly air sealing annular flange 203 on the piston chamber-forming member 20;

the first inner air sealing disc 156 extending radially outwardly from the stem 90 to an annular distal edge 157 in engagement with the cylindrical first inner portion 110 of the chamber wall 47 on the piston chamber-forming member 20 axially inwardly of the first outer air sealing annular flange 203;

the annular distal edge 157 of the first inner air sealing disc 156 engaging the first cylindrical inner portion 110 of the chamber wall 47 on the piston chamber-forming member 20 to prevent fluid flow axially upwardly therepast;

the inner air pump 170 having an inner air compartment 171 open to the inner air port 142 and defined (a) annularly between the stem 90 of the piston-forming element 22 and the first cylindrical inner portion 110 of the chamber wall 47 of the piston chamber-forming member 22, and (b) axially inwardly of the first inner air sealing disc 156;

in a cycle of operation in the withdrawal stroke, a volume of the inner air compartment 171 increases drawing air into the inner air compartment 171 and, in the retraction stroke, the volume of the inner air compartment 171 decreases discharging air from the inner air compartment 171 through the inner air port 142 into the passageway 63.]

[7. A piston pump as claimed in claim 6 wherein:

a cylindrical second inner portion 109 of the chamber wall 47 on the piston chamber-forming member 20 extends axially inwardly from the cylindrical first inner portion 110 of the chamber wall 47, the cylindrical second inner portion 109 of the chamber wall 47 having a diameter less than a diameter of the cylindrical first inner portion 110 of the chamber wall 47;

a second inner air sealing disc 140 on the stem 90 axially inwardly of the first outer air sealing annular flange 156 on the stem 90, the second inner air sealing disc 140 extending radially outwardly from the stem 90 to an annular distal edge 144 in engagement with the cylindrical second inner portion 109 of the chamber wall 47 on the piston chamber-forming member 20;

the annular distal edge 144 of the second inner air sealing disc 140 engaging the second cylindrical inner portion 109 of the chamber wall 47 on the piston chamber-forming member 20 to prevent fluid flow axially inwardly therepast;

an inner air compartment 142 defined (a) annularly between the stem 90 of the piston-forming element 22 and the first cylindrical inner portion 110 and the second cylindrical inner portion 109 of the chamber wall 47 of the piston chamber-forming member 20, and (b) axially between the first inner air sealing annular flange 156 and the second inner air sealing disc 140.]

[8. A piston pump as claimed in claim 7 wherein:

a liquid sealing disc 139 on the stem 90 axially inwardly of the first inner air sealing disc 140;

the liquid sealing disc 139 extending radially outwardly from the stem 90 to an annular distal edge 145 in engagement with the cylindrical second inner portion 109 of the chamber wall 47 on the piston chamber-forming member 20 axially inwardly of the second inner air sealing disc 140;

the annular distal edge 145 of the liquid sealing disc 139 engaging the second inner portion 109 of the chamber wall 47 on the piston chamber-forming member 20 to prevent fluid flow axially inwardly therepast;

the liquid sealing disc 139 being resilient and having an inherent bias biasing the annular distal edge 145 into engagement with the second inner portion 109 of the chamber wall 47 and deflectable against the bias from engagement with the second inner portion 109 of the chamber wall 47 to permit liquid fluid flow axially outwardly therepast when a pressure differential between a pressure on an inner axial side of the liquid sealing disc 139 is sufficiently greater than a pressure on an inner axial side of the liquid sealing disc 139;

a one-way valve 102 across the liquid inlet 28 permitting fluid flow therepast from the reservoir 13 into the chamber 26 and preventing fluid flow therepast from the chamber 26 into the reservoir 13, a liquid port 141 on the stem 90 axially between the liquid sealing disc 139 and the second inner air sealing disc 140;

the liquid port 141 extending radially inwardly through the stem 90 into the passageway 63;

the liquid pump 70 having a liquid compartment 106 open to the liquid port 141 and defined (a) annularly between the stem 90 of the piston-forming element 22 and the second inner portion 109 of the chamber wall 47 of the piston chamber-forming member 20, and (b) axially inwardly of the liquid sealing disc 139 between the liquid sealing disc 139 and the one-way valve 102;

in the cycle of operation in the withdrawal stroke, a volume of the liquid compartment 106 increases drawing liquid past the one-way valve 102 from the reservoir 13 into the liquid compartment 106 and, in the retraction stroke, the volume of the liquid compartment 106 decreases discharging liquid from the liquid compartment 106 past the liquid sealing disc 139 to between the liquid sealing disc 139 and the second inner air sealing disc 140 and through the liquid port 141 into the passageway 63.]

[9. A piston pump as claimed in claim 8 wherein:

the inner air pump 170 having a cylindrical inner air pump wall 110 provided by the piston chamber-forming member 20, a first inner air sealing disc 156 extending radially outwardly on the stem 90 axially outwardly of the inner air port 142 for sealing engagement with the inner air pump wall 110;

the first outer air sealing disc 256 extending radially outwardly on the stem 90 axially outwardly of the first inner air sealing disc 156 of the inner air pump 170;

the first outer air sealing annular flange 203 on the piston chamber-forming member 20 being axially outwardly of the first inner air sealing disc 156 of the inner air pump 170, the first outer air sealing annular flange 203 extending radially inwardly for sealing engagement with the radially outwardly directed stem wall 152 of the stem 90 axially outwardly of the first inner air sealing disc 156 of the inner air pump 170;

the first inner air sealing disc 156 extending radially outwardly on the stem 90 above the second inner air sealing disc 140 of the inner air pump 170 into sealing engagement with the cylindrical outer air pump wall 110 provided by the piston chamber-forming member 20 axially inwardly of the outer air sealing annular flange 203.]

[10. A piston pump as claimed in claim 9 wherein:

the piston-forming element 22 comprises:

a liquid piston 130 having a hollow tubular stem 131 with the inner end 134 and an outer end 135 and a central passage 133 longitudinally therethrough about the axis 23, an inner air piston 150 having a hollow tubular stem 151 with an inner end 154 and an outer end 155 and a central passage 153 longitudinally therethrough about the axis 23, and a first outer air piston 250 having a hollow tubular stem 251 with an inner end 254 and the outer end 255 and a central passage 253 longitudinally therethrough about the axis 23, the liquid piston 130, the inner air piston 150 and the first outer air piston 250 coaxially disposed about the axis 23 with:

(a) the outer end 135 of the liquid piston 130 coupled to the inner end 154 of the inner air piston 150 and the outer end 155 of the inner air piston 150 coupled to the inner end 254 of the first outer air piston 250, and (b) the central passage 133 of the liquid piston 130 opening axially into the central passage 153 of the inner air piston 150 and the central passage 153 of the inner air piston 150 opening axially into the central passage 253 of the first outer air piston 250 forming the central passageway 63 through the liquid piston 130, the inner air piston 150 and the first outer air piston 250, the first outer air sealing disc 256 carried on the inner end 254 of the first outer air piston 250 extending radially outwardly from the stem 251;

the first outer air port 162 on the inner air piston 150 proximate but axially inwardly of the first outer air sealing disc 256, the piston chamber-forming member 20 comprising:

a hollow tubular inner casing 101 having the end 24 and an outer end 105, and a hollow tubular first outer casing 201 having an inner end 204 and the outer end 205;

the inner casing 101 defining a liquid chamber 106 and an inner air chamber 107 therein, the liquid chamber 106 axially open to the inner end 24 of the inner casing 101 and opening axially inwardly into the inner air chamber 107 which is open to the outer end 105 of the inner casing 101;

the first outer casing 201 defining a first outer air chamber 207 therein, the inner casing 101 and the first outer casing 210 coaxially disposed about the axis 23 with:

(a) the outer end 105 of the inner casing 101 coupled to the inner end 204 of the first outer casing 201, and (b) the inner air chamber 107 opening axially into the first outer air chamber 207;

the first annular air sealing flange 203 coaxially carried by the first outer casing 201 fixed to the first outer casing 201 at the inner end 204 of the first outer casing 201, the stem 151 of the inner air piston 150 passing coaxially through the first annular air sealing flange 203 axially inwardly of the first outer air sealing disc 256, the first annular air sealing flange 203 extending radially inwardly from sealed engagement with the first outer casing 201 into engagement with the stem 151 of the inner air piston 150 axially inwardly of the first outer air port 162, the first outer air chamber 207 defined in an annular space radially inside the first outer casing 201 between the first outer casing 201 and the stem 151 of the inner air piston 150 and axially between first annular air sealing flange 203 and the first outer air sealing disc 256, the first outer air chamber 207 open via the first outer air port 162 into the passageway 153.]

11. A piston pump as claimed in claim 4 wherein:

the piston-forming element (22) comprises:

a liquid piston (130) having a hollow tubular stem (131) with the inner end (134) and an outer end (135) and a central passage (133) longitudinally therethrough about the axis (23), an inner air piston (150) having a hollow tubular stem (151) with an inner end (154) and an outer end (155) and a central passage (153) longitudinally therethrough about the axis (23), and a first outer air piston (250) having a hollow tubular stem (251) with an inner end (254) and [the] *an* outer end (255) and a central passage (253) longitudinally therethrough about the axis (23), a second outer air piston (350) having a hollow tubular stem (351) with an inner end (354) and an outer end (355) and a central passage (353) longitudinally therethrough about the axis (23), the liquid piston (130), the inner air piston (150), the first outer air piston (250) and the second outer air piston (350) coaxially disposed about the axis (23) with:

(a) the outer end (135) of the liquid piston (130) coupled to the inner end (154) of the inner air piston (150), the outer end (155) of the inner air piston (150) coupled to the inner end (254) of the first outer air piston (250), and the outer end of the first outer air piston (250) coupled to the inner end (*354*) of the second outer air piston (350), and (b) the central passage (133) of the liquid piston (130) opening axially into the central passage (153) of the inner air piston (150), the central passage (153) of the inner air piston (150) opening axially into the central passage (253) of the first outer air piston (250) and the central passage of the first outer air piston opening axially into the central passage of the second outer air piston forming the central passageway (63) through the liquid piston (130), the inner air piston (150), the first outer air piston (250) and the second outer air piston (350), the first outer air sealing disc (256) carried on the inner end (254) of the first outer air piston (250) extending radially outwardly from the stem (251), the second outer air sealing disc (356) carried on the inner end (354) of the second outer air piston (350) extending radially outwardly from the stem (351), the first outer air port (162) on the inner air piston (150) proximate but axially inwardly of the first outer air sealing disc (256), the second outer air port (262) on the first outer air piston (250) proximate but axially inwardly of the second outer air sealing disc (356), the piston chamber-forming member (20) comprising:

a hollow tubular inner casing (101) having the inner end (24) and an outer end (105), a hollow tubular first outer casing (201) having an inner end (204) and [the] *an* outer end (205); and a hollow tubular second outer casing (301) having an inner end (304) and an outer end (305);

the inner casing (101) defining a liquid chamber (106) and an inner air chamber (107) therein, the liquid chamber (106) axially open to the inner end (24) of the inner casing (101) and opening axially inwardly into the inner air chamber (107) which is open to the outer end (105) of the inner casing (101);

the first outer casing (201) defining a first outer air chamber (207) therein, the second outer casing (301) defining a second outer air chamber (307) therein;

the inner casing (101), the first outer casing (201) and the second outer casing (301) coaxially disposed about the axis (23) with:

(a) the outer end (105) of the inner casing (101) coupled to the inner end (204) of the first outer casing (201), (b) the inner air chamber (107) opening axially into the first outer air chamber (207), and (c) the first outer air chamber (207) opening axially into the second outer air chamber (307);

the first [annular] *outer* air sealing *annular* flange [203] (*231*) coaxially carried by the first outer casing (201) fixed to the first outer casing (201) at the inner end (204) of the first outer casing (201), the stem (151) of the inner air piston (150) passing coaxially through the first [annular] *outer* air sealing *annular* flange [203] (*231*) axially inwardly of the first outer air sealing disc (256), the first [annular] *outer* air sealing *annular* flange [203] (*231*) extending radially inwardly from sealed engagement with the first outer casing (201) into engagement with the stem (151) of the inner air piston (150) axially inwardly of the first outer air port (162), the first outer air chamber (207) defined in an annular space radially inside the first outer casing (201) between the first outer casing (201) and the stem (151) of the inner air piston (150) and axially between first [annular] *outer* air sealing *annular* flange [203] (*231*) and the first outer air sealing disc (256), the first outer air chamber (207) open via the first outer air port (162) into the passageway (153), the second [annular] *outer* air sealing *annular* flange [303] (*331*) coaxially carried by the second outer casing (301) fixed to the second outer casing (301) at the inner end (304) of the second [first] outer casing (301), the stem (251) of the first outer air piston (250) passing coaxially through the second [annular] *outer* air sealing

*annular* flange [303] (*331*) axially inwardly of the second outer air sealing disc (356), the second [annular] *outer* air sealing *annular* flange [303] (*331*) extending radially inwardly from sealed engagement with the second outer casing (301) into engagement with the stem (251) of the first outer air piston (250) axially inwardly of the second outer air port (262), the second outer air chamber (307) defined in an annular space radially inside the second outer casing (301) between the second [first] outer casing (301) and the stem (251) of the first outer air piston (250) and axially between the second [annular] *outer* air sealing *annular* flange [303] (*331*) and the second outer air sealing disc (356), the second outer air chamber (307) open via the second outer air port (262) into the passageway (253).

12. A piston pump as claimed in claim 11 wherein the inner air piston (150) and the first outer air piston (250) are identical modular elements.

13. A piston pump as claimed in claim 11 wherein the first outer casing (201) and the second outer casing (301) are identical modular elements.

14. A piston pump as claimed in claim 1 wherein: a cylindrical first inner portion (110) of the chamber wall [47] (*27*) on the piston chamber-forming member (20) extends axially inwardly from the first outer air sealing annular flange [203] (*231*);

a first inner air sealing disc (156) on the stem (90) axially inwardly of the first [outwardly] *outer* air sealing annular flange [203] (*231*) on the piston chamber-forming member (20);

the first inner air sealing disc (156) extending radially outwardly from the stem (90) to an annular distal edge (157) in engagement with the cylindrical first inner portion (110) of the chamber wall [47] (*27*) on the piston chamber-forming member (20) axially inwardly of the first outer air sealing annular flange [203] (*231*);

the annular distal edge (157) of the first inner air sealing disc (156) engaging the [first] cylindrical *first* inner portion 110 of the chamber wall [47] (*27*) on the piston chamber-forming member (20) to prevent fluid flow axially outwardly therepast;

the inner air pump (170) having an inner air compartment (171) open to the inner air port 142 and defined (a) annularly between the stem (90) of the piston-forming element (22) and the first cylindrical inner portion (110) of the chamber wall [47] (*27*) of the piston chamber-forming member [22] (*20*), and (b) axially inwardly of the first inner air sealing disc (156); in [a] *the* cycle of operation in the withdrawal stroke, a volume of the inner air compartment (171) increases drawing air into the inner air compartment (171) and, in the retraction stroke, the volume of the inner air compartment (171) decreases discharging air from the inner air compartment (171) through the inner air port (142) into the passageway (63).

[15. A piston pump as claimed in claim 14 wherein:

a cylindrical second inner portion 109 of the chamber wall 47 on the piston chamber-forming member 20 extends axially inwardly from the cylindrical first inner portion 110 of the chamber wall 47, the cylindrical second inner portion 109 of the chamber wall 47 having a diameter less than a diameter of the cylindrical first inner portion 110 of the chamber wall 47;

a second inner air sealing disc 140 on the stem 90 axially inwardly of the first outer air sealing annular flange 156 on the stem 90, the second inner air sealing disc 140 extending radially outwardly from the stem 90 to an annular distal edge 144 in engagement with the cylindrical second inner portion 109 of the chamber wall 47 on the piston chamber-forming member 20;

the annular distal edge 144 of the second inner air sealing disc 140 engaging the second cylindrical inner portion 109 of the chamber wall 47 on the piston chamber-forming member 20 to prevent fluid flow axially inwardly therepast;

an inner air compartment 142 defined (a) annularly between the stem 90 of the piston-forming element 22 and the first cylindrical inner portion 110 and the second cylindrical inner portion 109 of the chamber wall 47 of the piston chamber-forming member 20, and (b) axially between the first inner air sealing annular flange 156 and the second inner air sealing disc 140.]

[16. A piston pump as claimed in claim 15 wherein:

a liquid sealing disc 139 on the stem 90 axially inwardly of the first inner air sealing disc 140;

the liquid sealing disc 139 extending radially outwardly from the stem 90 to an annular distal edge 145 in engagement with the cylindrical second inner portion 109 of the chamber wall 47 on the piston chamber-forming member 20 axially inwardly of the second inner air sealing disc 140;

the annular distal edge 145 of the liquid sealing disc 139 engaging the second inner portion 109 of the chamber wall 47 on the piston chamber-forming member 20 to prevent fluid flow axially inwardly therepast;

the liquid sealing disc 139 being resilient and having an inherent bias biasing the annular distal edge 145 into engagement with the second inner portion 109 of the chamber wall 47 and deflectable against the bias from engagement with the second inner portion 109 of the chamber wall 47 to permit liquid fluid flow axially outwardly therepast when a pressure differential between a pressure on an inner axial side of the liquid sealing disc 139 is sufficiently greater than a pressure on an inner axial side of the liquid sealing disc 139;

a one-way valve 102 across the liquid inlet 28 permitting fluid flow therepast from the reservoir 13 into the chamber 26 and preventing fluid flow therepast from the chamber 26 into the reservoir 13, a liquid port 141 on the stem 90 axially between the liquid sealing disc 139 and the second inner air sealing disc 140;

the liquid port 141 extending radially inwardly through the stem 90 into the passageway 63;

the liquid pump 70 having a liquid compartment 106 open to the liquid port 141 and defined (a) annularly between the stem 90 of the piston-forming element 22 and the second inner portion 109 of the chamber wall 47 of the piston chamber-forming member 20, and (b) axially inwardly of the liquid sealing disc 139 between the liquid sealing disc 139 and the one-way valve 102;

in the cycle of operation in the withdrawal stroke, a volume of the liquid compartment 106 increases drawing liquid past the one-way valve 102 from the reservoir 13 into the liquid compartment 106 and, in the retraction stroke, the volume of the liquid compartment 106 decreases discharging liquid from the liquid compartment 106 past the liquid sealing disc 139 to between the liquid sealing disc 139 and the second inner air sealing disc 140 and through the liquid port 141 into the passageway 63.]

[17. A piston pump as claimed in claim 1 wherein:

the inner air pump 170 having a cylindrical inner air pump wall 110 provided by the piston chamber-forming member 20, a first inner air sealing disc 156 extending radially outwardly on the stem 90 axially outwardly of the inner air port 142 for sealing engagement with the inner air pump wall 110;

the first outer air sealing disc 256 extending radially outwardly on the stem 90 axially outwardly of the first inner air sealing disc 156 of the inner air pump 170;

the first outer air sealing annular flange 203 on the piston chamber-forming member 20 being axially outwardly of the first inner air sealing disc 156 of the inner air pump 170, the first outer air sealing annular flange 203 extending radially inwardly for sealing engagement with the radially outwardly directed stem wall 152 of the stem 90 axially outwardly of the first inner air sealing disc 156 of the inner air pump 170;

the first inner air sealing disc 156 extending radially outwardly on the stem 90 axially outwardly of the second inner air sealing disc 140 of the inner air pump 170 into sealing engagement with the cylindrical outer air pump wall 110 provided by the piston chamber-forming member 20 axially inwardly of the outer air sealing annular flange 203.]

18. A piston pump as claimed in claim 1 wherein:

the piston-forming element (22) comprises:

a liquid piston (130) having a hollow tubular stem (131) with the inner end (134) and an outer end (135) and a central passage (133) longitudinally therethrough about the axis (23), an inner air piston (150) having a hollow tubular stem (151) with an inner end (154) and an outer end (155) and a central passage (153) longitudinally therethrough about the axis (23), and a first outer air piston (250) having a hollow tubular stem (251) with an inner end (254) and [the] *an* outer end (255) and a central passage (253) longitudinally therethrough about the axis (23), the liquid piston (130), the inner air piston (150) and the first outer air piston (250) coaxially disposed about the axis (23) with:

(a) the outer end (135) of the liquid piston (130) coupled to the inner end (154) of the inner air piston (150) and the outer end (155) of the inner air piston (150) coupled to the inner end (254) of the first outer air piston (250), and (b) the central passage (133) of the liquid piston (130) opening axially into the central passage (153) of the inner air piston (150) and the central passage (153) of the inner air piston (150) opening axially into the central passage (253) of the first outer air piston (250) forming the central passageway (63) through the liquid piston (130), the inner air piston (150) and the first outer air piston (250), the first outer air sealing disc (256) carried on the inner end (254) of the first outer air piston (250) extending radially outwardly from the stem (251);

the first outer air port (162) on the inner air piston (150) proximate but axially inwardly of the first outer air sealing disc (256), the piston chamber-forming member (20) comprising:

a hollow tubular inner casing (101) having the *inner* end (24) and an outer end (105), and a hollow tubular first outer casing (201) having an inner end (204) and [the] *an* outer end (205);

the inner casing (101) defining a liquid chamber (106) and an inner air chamber (107) therein, the liquid chamber (106) axially open to the inner end (24) of the inner casing (101) and opening axially inwardly into the inner air chamber (107) which is open to the outer end (105) of the inner casing (101);

the first outer casing (201) defining a first outer air chamber (207) therein, the inner casing (101) and the first outer casing (210) coaxially disposed about the axis (23) with:

(a) the outer end (105) of the inner casing (101) coupled to the inner end (204) of the first outer casing (201), and (b) the inner air chamber (107) opening axially into the first outer air chamber (207), the first [annular] *outer* air sealing *annular* flange [203] (*231*) coaxially carried by the first outer casing (201) fixed to the first outer casing (201) at the inner end (204) of the first outer casing (201), the stem (151) of the inner air piston (150) passing coaxially through the first [annular] *outer* air sealing *annular* flange [203] (*231*) axially inwardly of the first outer air sealing disc (256), the first [annular] *outer* air sealing *annular* flange [203] (*231*) extending radially inwardly from sealed engagement with the first outer casing (201) into engagement with the stem (151) of the inner air piston (150) axially inwardly of the first outer air port (162), the first outer air chamber (207) defined in an annular space radially inside the first outer casing (201) between the first outer casing (201) and the stem (151) of the inner air piston (150) and axially between first [annular] *outer* air sealing *annular* flange [203] (*231*) and the first outer air sealing disc (256), the first outer air chamber (207) open via the first outer air port (162) into the passageway (153).

19. A piston pump as claimed in claim 18 wherein a cross-sectional area of the passageway (63) normal the axis varies along the axis.

20. A piston pump as claimed in claim 1 including a foam generator in the passageway (63) to mix the air and the liquid passing outwardly therethrough to produce foam.

* * * * *